United States Patent
Azimi-Sadjadi et al.

(10) Patent No.: US 12,554,001 B2
(45) Date of Patent: Feb. 17, 2026

(54) HYBRID METHOD FOR TIME-OF-ARRIVAL-BASED RANGING

(71) Applicant: ZaiNar, Inc., Redwood City, CA (US)

(72) Inventors: Babak Azimi-Sadjadi, Redwood City, CA (US); David Burgess, Redwood City, CA (US); Philip A. Kratz, Redwood City, CA (US); Jonathan S. Lu, Redwood City, CA (US); Raquel Guerreiro Machado, Redwood City, CA (US); Srdjan Miocinovic, Redwood City, CA (US); Jedidiah J. Whelan, Redwood City, CA (US); Siamak Yousefi, Redwood City, CA (US)

(73) Assignee: Zainar, Inc., Redwood City, CA (US)

( * ) Notice: Subject to any disclaimer, the term of this patent is extended or adjusted under 35 U.S.C. 154(b) by 271 days.

(21) Appl. No.: 18/513,332

(22) Filed: Nov. 17, 2023

(65) Prior Publication Data

US 2024/0085547 A1    Mar. 14, 2024

Related U.S. Application Data

(63) Continuation-in-part of application No. 18/376,327, filed on Oct. 3, 2023, which is a continuation of
(Continued)

(51) Int. Cl.
*G01S 13/08*    (2006.01)
*G01S 7/02*    (2006.01)
(Continued)

(52) U.S. Cl.
CPC ............ *G01S 13/08* (2013.01); *G01S 7/0233* (2021.05); *G01S 7/03* (2013.01); *G01S 7/285* (2013.01)

(58) Field of Classification Search
None
See application file for complete search history.

(56) References Cited

U.S. PATENT DOCUMENTS

| | | | | | |
|---|---|---|---|---|---|
| 5,363,109 A | * | 11/1994 | Hofgen | ...................... | G01S 7/40 342/37 |
| 5,550,549 A | * | 8/1996 | Procter, Jr. | .............. | G01S 13/84 342/134 |

(Continued)

*Primary Examiner* — Bernarr E Gregory
(74) *Attorney, Agent, or Firm* — Run8 Patent Group, LLC; Peter Miller; Brian T. Chew

(57) ABSTRACT

A method includes: receiving a ranging signal from the transmitter including a set of multiplexed sub-signals, each multiplexed sub-signal characterized by a frequency in a set of frequencies; calculating a sample-based time-of-arrival estimate based on the series of time-domain samples of the ranging signal; calculating a sample-based uncertainty of the sample-based time-of-arrival; for each sub-signal pair in a subset of multiplexed sub-signals of the set of multiplexed sub-signals, extracting a phase difference of the sub-signal pair; calculating a phase-based time-of-arrival estimate based on the phase difference of each sub-signal pair in the subset of multiplexed sub-signals; calculating a phase-based uncertainty of the phase-based time-of-arrival estimate; and calculating a hybrid time-of-arrival estimate as a weighted combination of the sample-based time-of-arrival estimate, the phase-based time-of-arrival estimate, based on the sample-based uncertainty and the phase-based uncertainty.

20 Claims, 9 Drawing Sheets

Related U.S. Application Data application No. 17/958,206, filed on Sep. 30, 2022, now Pat. No. 11,808,835, which is a continuation of application No. 17/511,433, filed on Oct. 26, 2021, now Pat. No. 11,493,619.

(60) Provisional application No. 63/426,234, filed on Nov. 17, 2022, provisional application No. 63/105,822, filed on Oct. 26, 2020.

(51) Int. Cl.
*G01S 7/03* (2006.01)
*G01S 7/285* (2006.01)

(56) References Cited

U.S. PATENT DOCUMENTS

| | | | | |
|---|---|---|---|---|
| 6,259,991 B1 * | 7/2001 | Nysen | ............... | H04W 64/00 |
| | | | | 342/44 |
| 6,768,456 B1 * | 7/2004 | Lalezari | ............... | H01Q 21/205 |
| | | | | 342/373 |
| 7,057,556 B2 * | 6/2006 | Hall | ............... | G01S 5/06 |
| | | | | 342/465 |
| 7,925,251 B2 * | 4/2011 | Hochdorf | ............... | G01S 7/4017 |
| | | | | 455/67.11 |
| 8,026,850 B2 * | 9/2011 | Seong | ............... | G01S 5/14 |
| | | | | 342/387 |
| 9,194,936 B1 * | 11/2015 | Keegan | ............... | G01S 5/0273 |
| 11,493,619 B2 * | 11/2022 | Chowdhury | ............ | G01S 13/08 |
| 11,808,835 B2 * | 11/2023 | Chowdhury | ............ | G01S 7/0233 |
| 2010/0240396 A1 * | 9/2010 | Zhang | ............... | G01S 5/14 |
| | | | | 455/456.1 |
| 2010/0279707 A1 * | 11/2010 | Fischer | ............... | G01S 5/0226 |
| | | | | 455/67.11 |
| 2016/0011295 A1 * | 1/2016 | Keegan | ............... | G01S 5/14 |
| | | | | 455/456.1 |
| 2018/0160390 A1 * | 6/2018 | Aldana | ............... | H04W 64/00 |
| 2020/0191979 A1 * | 6/2020 | Lindskog | ............... | G01S 5/0226 |
| 2020/0355785 A1 * | 11/2020 | Li | ............... | G01S 5/06 |

* cited by examiner

S100

| TOA/RANGE ESTIMATION METHOD | RELATIVE PRECISION | MULTIPATH RESILIENCE | COMPUTATIONAL COMPLEXITY | USEFUL RANGE | LIMITATIONS | TARGET APPLICATION |
|---|---|---|---|---|---|---|
| SAMPLE-BASED (S112, S120) | 1 LOW | 5 HIGH | 1 LOW | 5 HIGH | HIGH SIGNAL BANDWIDTH FOR PRECISION | LIMIT, OUTLIER DETECTION |
| PHASE-BASED (S132, S134, S136) | 5 HIGH | 1 LOW | 1 LOW | 5 HIGH | FREQUENCY SPACING; $2\text{-}\pi$ AMBIGUITY; MULTIPATH OUTLIERS | PRECISION RANGING |
| PHASE-AMPLITUDE-BASED (S140, S142) | 4 MEDIUM-HIGH | 5 HIGH | 5 HIGH | 5 HIGH | COMPLEXITY; TDOA AMBIGUITY | PRECISION RANGING |
| SUB-SAMPLE-BASED | 5 HIGH | 1 LOW | 2 MEDIUM-LOW | 5 HIGH | MULTIPATH OUTLIERS | PRECISION RANGING |
| SIGNAL STRENGTH/PATH-LOSS BASED | 1 LOW | 3 MEDIUM | 1 LOW | 1 LOW (<20m) | LIMITED RANGE | LIMIT, PROXIMITY, OUTLIER DETECTION |

*FIGURE 9*

HYBRID METHOD FOR TIME-OF-ARRIVAL-BASED RANGING

CROSS-REFERENCE TO RELATED APPLICATIONS

This application is a continuation-in-part application of U.S. patent application Ser. No. 18/376,327, filed on Oct. 3, 2023, which is a continuation application of U.S. patent application Ser. No. 17/958,206, filed on Sep. 30, 2022, now U.S. Pat. No. 11,808,835, which is a continuation application of U.S. patent application Ser. No. 17/511,433, filed on Oct. 26, 2021, now U.S. Pat. No. 11,493,619, which claims the benefit of U.S. Provisional Application No. 63/105,822, filed on Oct. 26, 2020, each of which is incorporated in its entirety by this reference.

This application claims the benefit of U.S. Provisional Application No. 63/426,234, filed on 17 Nov. 2022, which is incorporated in its entirety by this reference.

This Application is related to U.S. patent application Ser. No. 17/379,885, filed on Jul. 19, 2021, now U.S. Pat. No. 11,445,333; U.S. patent application Ser. No. 17/379,873, filed on Jul. 19, 2021, now U.S. Pat. No. 11,425,536; U.S. patent application Ser. No. 17/105,458, filed on Nov. 25, 2020, now U.S. Pat. No. 11,785,482; and, U.S. patent application Ser. No. 16/846,030, filed on Apr. 10, 2020, now U.S. Pat. No. 11,722,979, each of which is incorporated in its entirety by this reference.

TECHNICAL FIELD

This invention relates generally to the field of time-of-arrival-based ranging and more specifically to a new and useful method for hybrid ranging in the field of time-of-arrival-based ranging.

BRIEF DESCRIPTION OF THE FIGURES

FIG. 9 is a table of time-of-arrival estimation processes in one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
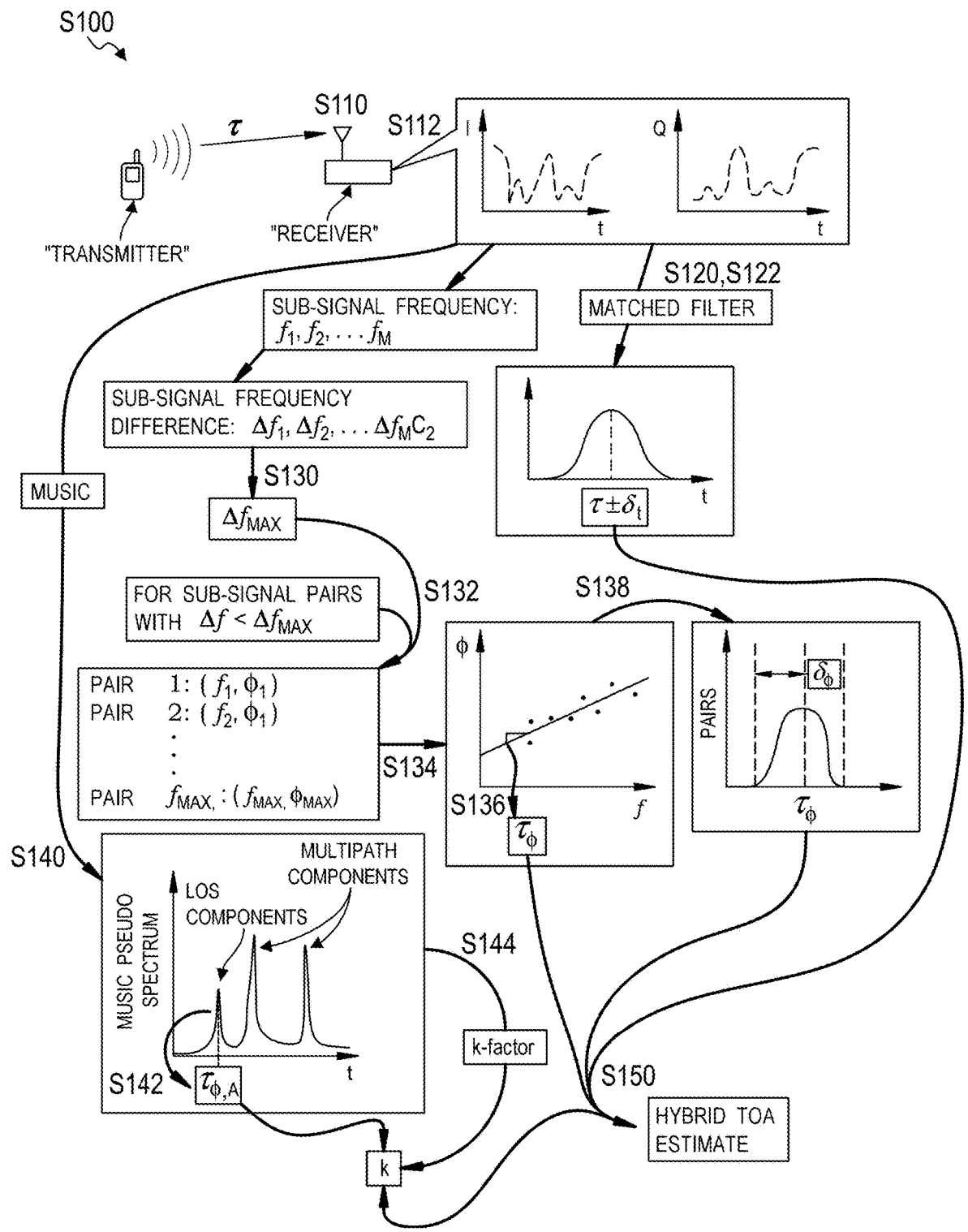
FIG. 1 is a schematic representation of a method.

As shown in FIG. 1, a method for estimating a time-of-arrival of a ranging signal transmitted from a transmitter to a receiver including: accessing the ranging signal including a set of multiplexed sub-signals, each multiplexed sub-signal characterized by a frequency in a set of frequencies in Block S110; recording a series of time-domain samples representing the ranging signal in Block S112; calculating a sample-based time-of-arrival estimate based on the series of time-domain samples in Block S120; calculating a sample-based uncertainty based on the sampling frequency of the receiver in Block S122; and calculating a maximum frequency difference in the set of frequencies characterized by a total phase accumulation of less than $2\pi$ radians during the sample-based time-of-arrival estimate in Block S130. The method also includes, for each sub-signal pair in the set of sub-signal pairs characterized by a frequency difference less than the maximum frequency difference: extracting a phase difference of the sub-signal pair in Block S132; and calculating a sub-signal pair time-of-arrival estimate in a set of sub-signal time-of-arrival estimates based on the phase differences of the sub-signal pairs in Block S134. The method further includes: calculating a phase-based time-of-arrival estimate based on a measure of central tendency of the set of sub-signal pair time-of-arrival estimates in Block S136; calculating a phase-based uncertainty based on a variability measure of the set of sub-signal pair time-of-arrival estimates in Block S138; executing a multiple signal classification algorithm to detect a set of multipath components of the ranging signal in Block S140; calculating a phase-amplitude-based time-of-arrival estimate based on the set of multipath components of the ranging signal in Block S142; calculating a K-factor based on a power ratio of an earliest-arriving component to all other components in the set of multipath components in Block S144; and calculating a hybrid time-of-arrival estimate as a weighted combination of the sample-based time-of-arrival estimate, the phase-based time-of-arrival estimate, and the phase-amplitude-based time-of-arrival estimate based on the sample-based uncertainty, the phase-based uncertainty, and the K-factor in Block S150.

1.1 Variation: Sample-Based and the Phase-Based Estimate

One variation of the method S100 includes: at a receiver, receiving the ranging signal from the transmitter, the ranging signal including a set of multiplexed sub-signals, each multiplexed sub-signal characterized by a frequency in a set of frequencies in Block S110; recording a series of time-domain samples representing the ranging signal in Block S112; calculating a sample-based time-of-arrival estimate based on the series of time-domain samples in Block S120; calculating a sample-based uncertainty of the sample-based time-of-arrival estimate based on the sampling frequency of the receiver in Block S122; for each sub-signal pair in a subset of multiplexed sub-signals of the set of multiplexed sub-signals, extracting a phase difference of the sub-signal pair in Block S132; calculating a phase-based time-ofarrival estimate based on the phase difference of each sub-signal pair in the subset of multiplexed sub-signals in Block S136; calculating a phase-based uncertainty of the phase-based time-of-arrival estimate based on a variability measure based on the phase difference of each sub-signal pair in the subset of multiplexed sub-signals in Block S138; and calculating a hybrid time-of-arrival estimate as a weighted combination of the sample-based time-of-arrival estimate, the phase-based time-of-arrival estimate, based on the sample-based uncertainty and the phase-based uncertainty, in Block S150.

1.2 Variation: Sample-Based and the Phase-Amplitude-Based Estimate

Another variation of the method S100 includes: at the receiver, receiving the ranging signal from the transmitter, the ranging signal including a set of multiplexed sub-signals, each multiplexed sub-signal characterized by a frequency in a set of frequencies in Block S110; recording a series of time-domain samples representing the ranging signal in Block S112; calculating a sample-based time-of-arrival estimate based on the series of time-domain samples in Block S120; calculating a sample-based uncertainty based on the sampling frequency of the receiver in Block S122; executing a multiple signal classification algorithm to detect a set of multipath components of the ranging signal in Block S140; calculating a phase-amplitude-based time-of-arrival estimate based on the set of multipath components of the ranging signal in Block S142; calculating a K-factor based on a power ratio of an earliest-arriving component to all other components in the set of multipath components in Block S144; and calculating a hybrid time-of-arrival estimate as a weighted combination of the sample-based time-of-arrival estimate and the phase-amplitude-based time-of-arrival estimate based on the sample-based uncertainty and the K-factor in Block S150.

1.3 Variation: Uncertainty and K-Factor Weighted Estimate

Yet another variation of the method S100 includes: accessing a ranging signal transmitted by a transmitter and received by a receiver, the ranging signal including a set of multiplexed sub-signals, each multiplexed sub-signal characterized by a frequency in a set of frequencies in Block S110; for each sub-signal pair in a subset of multiplexed sub-signals of the set of multiplexed sub-signals, extracting a phase difference of the sub-signal pair in Block S132; calculating a phase-based time-of-arrival estimate based on the phase difference of each sub-signal pair in the subset of multiplexed sub-signals in Block S136; calculating a phase-based uncertainty of the phase-based time-of-arrival estimate based on a variability measure based on the phase difference of each sub-signal pair in the subset of multiplexed sub-signals in Block S138; executing a multiple signal classification algorithm to detect a set of multipath components of the ranging signal in Block S140; calculating a phase-amplitude-based time-of-arrival estimate based on the set of multipath components of the ranging signal in Block S142; calculating a K-factor based on a power ratio of an earliest-arriving component to all other components in the set of multipath components in Block S144; and calculating the hybrid time-of-arrival estimate as a weighted combination of the phase-based time-of-arrival estimate and the phase-amplitude-based time-of-arrival estimate based on the phase-based uncertainty and the K-factor in Block S150.

2. Applications

As shown in FIGS. 1, 5, 6, and 10A-10C, the method S100 is executed by a system including a receiver (or transceiver) and/or a remote server in order to estimate a time-of-arrival (hereinafter "TOA") of a ranging signal transmitted by a transmitter (or transmitting device) for the purpose of accurate ranging and localization. More specifically, the system can: receive a ranging signal including a set of multiplexed sub-signals, each characterized by a unique frequency (e.g., subcarrier frequency or carrier frequency); execute a sample-based TOA estimation process, a phase-based TOA estimation process, a phase-amplitude based TOA estimation process, a sub-sample-based TOA estimation process, a sparse multipath-based TOA estimation process, and/or a signal strength-based range estimation process, all of which are based on information derived from the ranging signal; and combine the results of these processes to obtain a TOA estimate. Thus, the system can mitigate inaccuracies inherent to any one of these processes and consistently calculate accurate TOA estimates independent of the local multipath channel, hardware inadequacies (e.g., frequency-dependent amplitude), or software inadequacies at the receiver or transmitter.

Upon receiving a ranging signal from the transmitter, the system can capture (i.e., measure and/or record) a series of time domain samples representing the ranging signal and can calculate a sample-based TOA estimate for the ranging signal based on these samples, such as via a matched filter. However, the sample-based TOA estimate is limited in accuracy by the sampling frequency of the system and the effects of multipath fading on the ranging signal. Thus, the system can supplement the sample-based estimate with additional estimates based on other characteristics of the ranging signal in order to improve the sample-based estimate and arrive at a hybrid TOA estimate with greater accuracy.

In addition to recording the series of time domain samples representing the ranging signal, the system can additionally extract the phase (e.g., the phase of arrival at the receiver) of each sub-signal in the set of sub-signals including the ranging signal. The system can then calculate a phase-based TOA estimate based on the extracted phase of each sub-signal of the ranging signal. While the system can calculate a phase-based TOA estimate that may be robust to hardware-dependent amplitude variations, the phase-based TOA may still be affected by strong multipaths, which may manifest as an unpredictable frequency-dependent phase delay across the set of sub-signal phases. Thus, the system can use a third TOA estimate as a cross-reference for the sample-based TOA estimate and the phase-based TOA estimate.

In addition to extracting the phase of each sub-signal, the system can utilize both the phase of each sub-signal as well as the amplitude of each sub-signal in order to calculate a phase-amplitude-based TOA estimate. For example, the system can execute a multiple signal classification algorithm (hereinafter "MUSIC algorithm"), whereby the system can identify a TOA associated with each multipath component of the ranging signal, as well as a power associated with each multipath component, by calculating eigenvectors of the autocorrelation matrix of the ranging signal. The system can then calculate a phase-amplitude TOA by selecting the earliest identified TOA as the line-of-sight (hereinafter "LOS") TOA. Although the system can calculate a phase-amplitude TOA estimate that may remain accurate in a strong multipath environment, the phase-amplitude TOA estimate may be sensitive to hardware imperfections including non-linearities or uncalibrated non-reciprocities in the transmit-receive chains, which violate the assumptions of the MUSIC algorithm. However, in addition to extracting a third estimate for the TOA of the ranging signal, the system can utilize the MUSIC algorithm and/or other phase-amplitude-based TOA estimation methods (e.g., an ordinary beam-forming algorithm, Capon's beam-forming algorithm, and estimation of signal parameters via rotational invariance techniques or ESPRIT) to characterize the multipath environment of the ranging signal (e.g., by calculating multipath metrics of the ranging signal based on the identified multipath components of the ranging signal).

In addition, the system can then execute the sub-sample-based TOA estimation process, the sparse multipath-based TOA estimation process, and/or the signal strength-based range estimation process to compute a set of TOA (and/or range) estimates. More specifically, the system can compute a signal strength of the test ranging signal based on a signal strength parameter and a path loss (hereafter "PL") metric. The system can also compute a signal strength-based range estimate according to a set of line-of-sight (e.g., LOS, NLOS) functions descriptive of ranging signal path loss trends in different communication environments. The system can further compute a subsample-based TOA estimate based on a correlation peak estimation and a vector-based TOA estimation by computing a loss function associated with a matrix representation of the ranging signal. Thus, the system can compute a set of initial TOA estimates for a ranging signal transmitted from a transmitter of a first node in a wireless communication network to a receiver of a second node in the wireless communication network. For example, the system can compute a set of TOA estimates for a mobile device in the mobile device group deployed in the target environment for subsequent localization and ranging.

The system can then combine the sample-based TOA estimate, the phase-based TOA estimate, the phase-amplitude-based TOA estimate, the sub-sample-based based TOA estimate, a sparse multipath-based TOA estimate, and/or a signal strength-based TOA estimate based on the characterization of the multipath environment as well as the sample-based uncertainty and the phase-based uncertainty of the sample-based TOA estimate and the phase-based TOA estimate respectively. Thus, the system can calculate a hybrid TOA estimate that improves accuracy in the face of multipath and hardware non-linearities without necessitating an increase in the sampling rate of the receiver or the bandwidth of the ranging signal.

3. Terms

Generally, a "range estimation process" as referred to herein is a process in which the system can compute a range estimate (or distance) between a transmitter and a receiver based on a ranging signal transmitted from the transmitter and received at the receiver.

Generally, a "time-of-arrival estimation process" as referred to herein is a process in which the system can compute a time-of-arrival estimate of a time-of-arrival of the ranging signal at a receiver. Generally, the system can compute a range estimate based on the time-of-arrival estimate. Therefore, "time-of-arrival estimation process" and "range estimation process" can be used interchangeably throughout this application.

4. Network

Figure 3A:
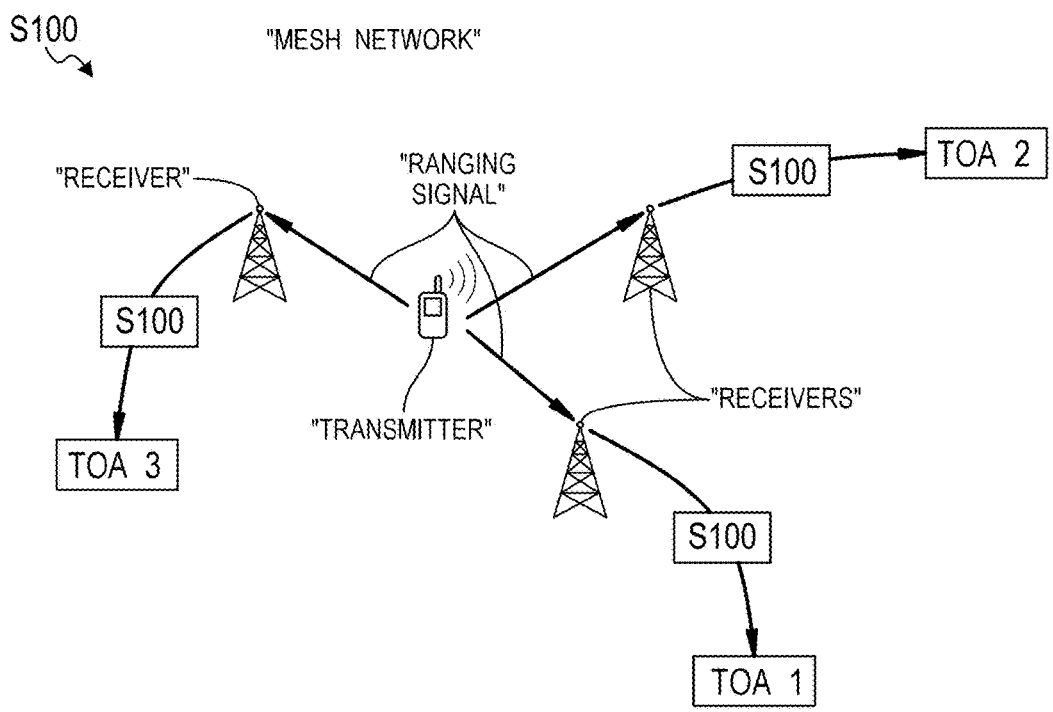
FIG. 3A is a schematic representation of one variation of the method.
Figure 3B:
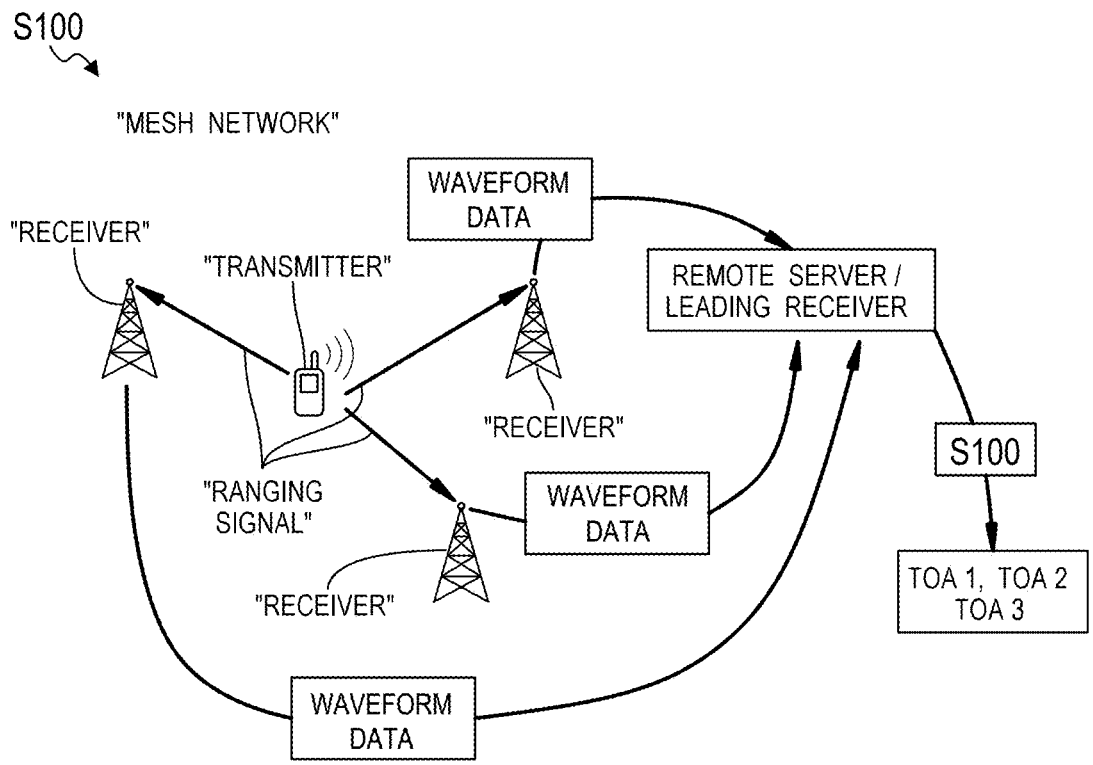
FIG. 3B is a schematic representation of one variation of the method.

Generally, the method S100 is executed in the context of a wired or wireless communication network—, such as the mesh network described in U.S. patent application Ser. No. 17/105,458. The mesh network can include a set of transceivers (e.g., custom wireless tag readers, 5G gNodeBs, 4G-LTE eNodeBs) configured to receive ranging signals from other transceivers participating in the mesh network or from transmitters (e.g., passive or active tags, 5G or 4G-LTE user equipment) and/or execute Blocks of the method S100. Upon receiving a ranging signal, a transceiver can execute Blocks of the method S100 locally, as shown in FIG. 3A, or can instead transmit raw waveform data or some intermediate output of the method S100 to a remote server or leading transceiver for further processing according to Blocks of the method S100, as shown in FIG. 3B. Thus, the system can execute Blocks of the method S100 at transceivers within a mesh network or at a central computational device (i.e., a remote server or leading transceiver) that may track other parameters characterizing the mesh network (e.g., the relative location and time biases of each transceiver in the mesh network).

In one implementation, transceivers in the mesh network self-localize by executing Blocks of the method S100 with respect to ranging signals transmitted from transceiver to transceiver in the mesh network. More specifically, by executing the method S100 in order to obtain accurate time-of-flight measurements between transceivers on a pairwise basis, the system can calculate distances for pairwise ranging of a transceivers pair and, assuming sufficient connectivity between transceivers in the mesh network, estimate the relative locations of each transceiver in the mesh network. Additionally, or alternatively, the system can execute Blocks of the method S100 with respect to ranging signals sent from a transmitter (e.g., a passive or active tag, 5G or 4G-LTE, user equipment) to a transceiver, as part of an uplink localization protocol. Thus, by executing multiple instances of the method S100 for a ranging signal sent from a transmitter and received by multiple transceivers, the system can calculate accurate time-of-flights (hereinafter "TOF") for the ranging signal at each transceiver in the mesh network and can execute TOA or time-difference-of-arrival (hereinafter "TDOA") multilateration to estimate a location of the transmitter.

Figure 3C:
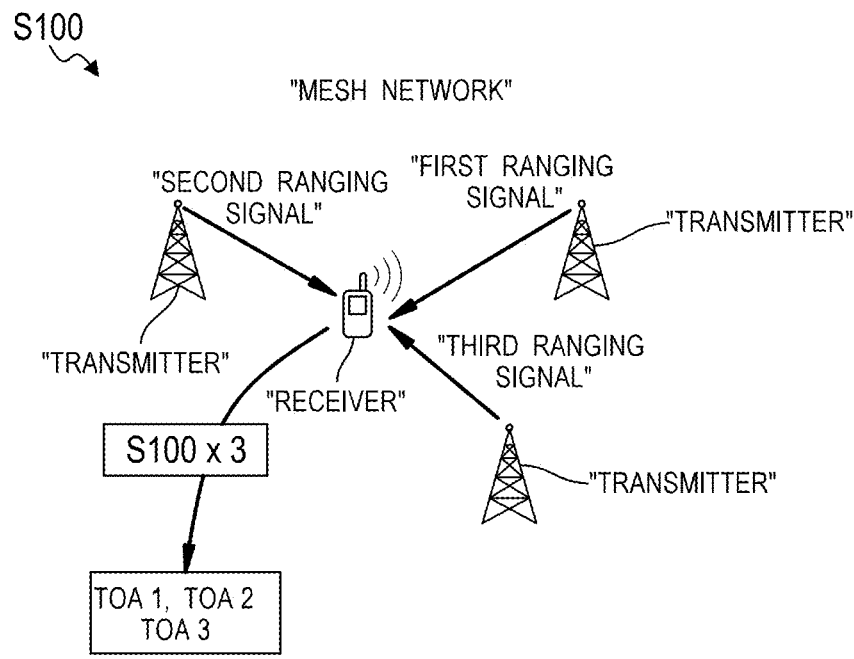
FIG. 3C is a schematic representation of one variation of the method.

In another implementation, shown in FIG. 3C, Blocks of the method S100 are executed by a receiver of multiple ranging signals in a downlink localization protocol. In this implementation, a single receiver (e.g., 5G or 4G-LTE) executes an instance of the method S100 for each ranging signal received by the receiver. The receiver can then estimate its location given a location of the transmitter of each received ranging signal.

Generally, the method S100 is described below with respect to a ranging signal transmitted by a transmitter and received by a transceiver. However, the receiver and transmitter described below may be deployed in any of the contexts described above. Additionally, Blocks of the method S100 can be executed by a receiver of a ranging signal, by a remote computational device, or by a combination of both.

4.1 Receiver

Generally, the system can include a receiver configured to receive ranging signals transmitted from a transmitter. More specifically, the receiver can include RF receiving components, such as an antenna, amplifiers, mixers, filters, an analog-to-digital converter (hereinafter "ADC"), and/or a digital signal processor (hereinafter "DSP") arranged in a superheterodyne, heterodyne, or homodyne architecture. In one implementation, the system can include a receiver, such as a wireless base station or wireless node within a network (e.g., a 4G or 5G network). In this implementation, the system can time synchronize the receiver with other receivers in the network in order to improve localization of transmitters within range of multiple receivers.

In one implementation, such as in a downlink localization protocol context, or in a pairwise localization protocol context, the receiver is configured to execute Blocks of the method S100 to locally generate a hybrid TOA estimate. Alternatively, the receiver is configured to receive the ranging signal and transmit waveform data representing the ranging signal to a remote computational device executing the method S100.

4.2 Transmitter

Generally, the system can estimate TOAs of ranging signals transmitted from a transmitter to the receiver in order to calculate a TOF of the ranging signal and therefore a range between the transmitter and the receiver. More specifically, the transceiver can be any device (including another receiver within the network) capable of transmitting the ranging signal. In one implementation, the transmitter can be a user device within a network, such as a smartphone, smartwatch, tablet computer, laptop computer, or any other network-capable computing device.

4.3 Remote Computational Device

In one implementation, a remote computational device in communication with the receiver is configured to execute Blocks of the method S100 in order to generate a hybrid TOA estimate. In this implementation, the remote computational device can be a cloud server connected to one or more receivers configured to receive a ranging signal from a transmitter. In this implementation, the remote computational device can execute any subset of the Blocks of the method S100 not executed by receivers.

5. Ranging Signal

Generally, the system executes Blocks of the method S100 in order to estimate the TOA of the ranging signal upon reception of the ranging signal by the receiver. In order for the system to estimate the TOA of the ranging signal, the system can receive a ranging signal including a set of multiplexed sub-signals, wherein each sub-signal is characterized by a unique carrier frequency in a set of carrier frequencies in Block S110. Thus, by receiving a multiplexed signal with multiple frequency components, the system can execute the phase-only and phase-amplitude processes in order to estimate the TOA of the ranging signal.

Additionally, in order to calculate a sample-based TOA estimate, the system can capture a series of time-domain digital samples representing the ranging signal in Block S112. By recording a series of samples representing the ranging signal, the system can calculate a more accurate sample-based TOA estimate by executing matched filter techniques or other super-resolution techniques that are more effective with increased signal length and complexity.

5.1 Carrier Frequency Hopping Scheme

In one implementation, the system can receive a ranging signal including a set of time division multiplexed sub-signals each characterized by a unique carrier frequency (i.e., a carrier frequency hopping scheme). More specifically, in this implementation, the system can receive a frequency-hopping spread spectrum signal including the set of multiplexed sub-signals, each multiplexed sub-signal characterized by the frequency in the set of frequencies.

In this implementation, the transmitter can transmit time-division-multiplexed sub-signals in successive slots of a time-division multiplexing scheme in order to provide phase information across multiple frequencies. The system can receive each successive sub-signal during the corresponding slot and extract the timing and phase information from that signal. The transmitter can vary the carrier frequency of each successive sub-signal such that the frequencies characterizing the set of sub-signals spans the available bandwidth within the channel. The system can calculate the TOA of each sub-signal and the phase of each sub-signal. The system can then calculate an accurate TOF between the transmitter and receiver based on these TOAs and these phases extracted from the ranging signal.

The method by which the system can extract accurate phase and TOA from a time-division multiplexed signal is further described in U.S. patent application Ser. No. 16/846,030.

5.2 Subcarrier Signal Scheme

In another implementation, the system can receive a ranging signal including a set of frequency-division multiplexed (e.g., orthogonal frequency division multiplexed) sub-signals, each characterized by a unique subcarrier frequency. More specifically, the system can receive an orthogonal-frequency-division-multiplexed signal including the set of multiplexed sub-signals, each multiplexed sub-signal characterized by the frequency in the set of frequencies.

In this implementation, the system receives a single signal including multiple subcarrier signals and can extract a unique phase corresponding to each subcarrier frequency of the subcarrier signal. The system can then extract the phase information from each subcarrier according to methods described in U.S. Provisional Application No. 63/053,509 and calculate a single time-of-arrival of the ranging signal.

6. Sample-Based Time-of-Arrival Estimation

Generally, upon receiving the ranging signal from the transmitter, the system can calculate a sample-based TOA estimation, $\tau_t$, in Block S120 and a sample-based uncertainty, $\delta_t$, based on the sampling frequency of the receiver in Block S122. More specifically, the system can directly calculate a TOA estimation based on time domain samples captured at the receiver. Upon calculating the sample-based TOA estimation, the system can leverage precise time synchronization (or precise characterization of a time bias) between the receiver and the transmitter in order to estimate the TOF of the ranging signal and, therefore, the distance between the receiver and the transmitter.

The system can utilize time domain sampling, oversampling, and/or matched filter techniques to detect the time-of-arrival (or times-of-arrival in the case of a time-division multiplexed signal) of the ranging signal.

In one implementation, the system can utilize a matched filter to identify a TOA based on a set of discrete time domain samples. More specifically, the system can: access a template signal corresponding to the ranging signal; correlate the template signal with the series of time-domain samples to identify a correlation peak; and calculate the sample-based time-of-arrival estimate based on the correlation peak.

Alternatively, the system can execute super-resolution methods, such as those described in U.S. patent application Ser. No. 16/846,030, to increase the accuracy and/or precision of calculated TOA of the ranging signal. Upon calculating the TOA of the ranging signal, the system can access the transmission time of the ranging signal (or each time-divided sub-signal of the ranging signal) in order to calculate a TOF or a set of TOFs of the ranging signal (assuming sufficient clock synchronization between the transmitter and the receiver, e.g., nanosecond level clock synchronization).

For example, in applications in which the ranging signal is a frequency-division multiplexed signal, the system can subtract the transmission time of the ranging signal from the calculated TOA of the ranging signal to calculate a TOF estimate of the ranging signal. Alternatively, in applications in which the ranging signal is a time-division multiplexed signal, the system can average the differences between corresponding transmission times and TOAs of the set of sub-signals including the ranging signal.

Figure 10A:
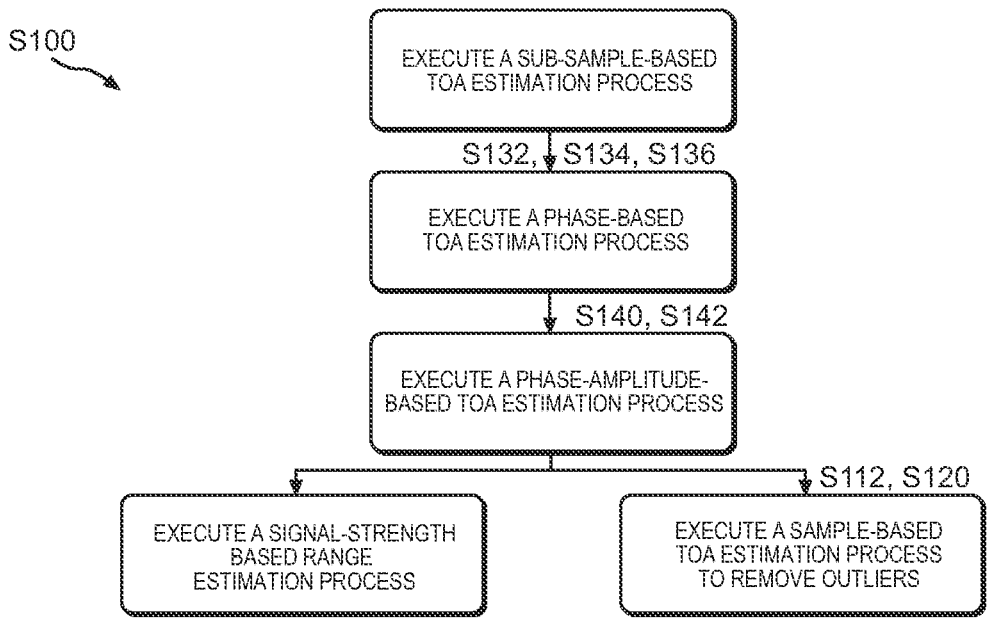
FIG. 10A is a flowchart representation of one variation of the method.
Figure 10B:
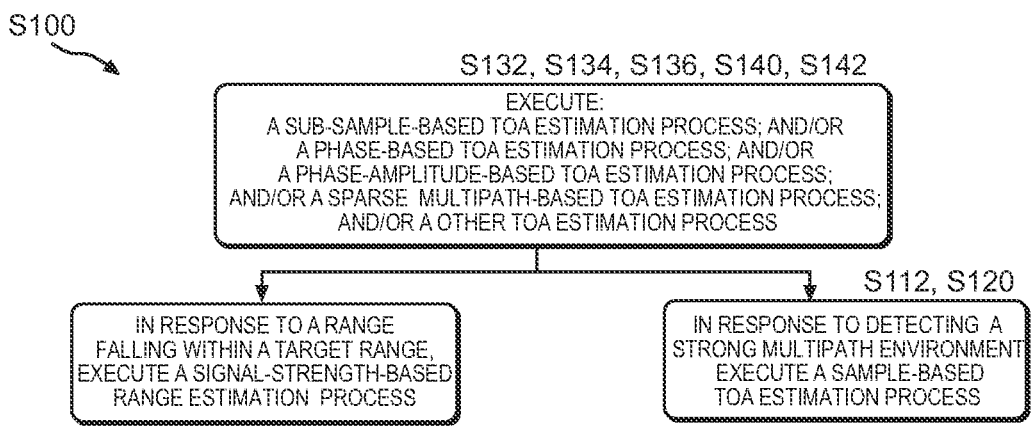
FIG. 10B is a flowchart representation of one variation of the method.
Figure 10C:
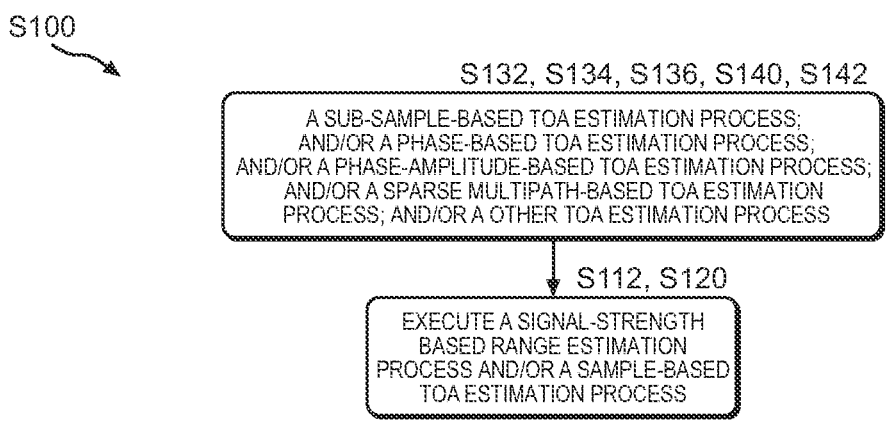
FIG. 10C is a flowchart representation of one variation of the method.

As shown in FIGS. 10A-10C, in one example, the system can calculate a sample-based TOA estimate in response to detecting a strong multipath environment surrounding the transmitter and the receiver. More specifically, the system can: based on a signal classification function, detect a set of multipath components characteristic of the first ranging signal; calculate a multipath metric characterizing a power ratio between a line-of-sight component and non-line-of-sight components in the set of multipath components of the second ranging signal; and, in response to the multipath metric indicating a strong multipath environment between the transmitter and the receiver, calculate a sample-based TOA estimate. Then, the system can calculate the hybrid TOA estimate based on the sample-based TOA estimate and any other TOA estimate computed for the ranging signal. Therefore, in response to detecting the strong multipath environment, the system can calculate the low resolution sample-based TOA estimate and then combine this with the high resolution phase-amplitude TOA estimate to find the hybrid range/TOA. In response to detecting a multipath metric that indicates the presence of strong line-of-sight component, the system can leverage implement this hybrid TOA estimation approach leveraging the sample-based TOA estimate and combining it with the phase-based TOA estimate.

6.1 Uncertainty Estimation

In addition to calculating a sub sample-based TOA estimate, the system also calculates a sub sample-based uncertainty (or confidence interval) for the TOA estimate. More specifically, the system can calculate a sub sample-based uncertainty based on the sampling frequency of the receiver in Block S122. Thus, by calculating a sub sample-based uncertainty, the system can weigh the sub sample-based TOA estimate appropriately relative to the phase-based TOA estimate and the phase-amplitude-based TOA estimate.

In one implementation, the system can calculate a sub sample-based uncertainty based on the peak shape of a matched filter output for the ranging signal. More specifically, the system can: execute a matched filter on a set of time-domain samples of the ranging signal to calculate a matched filter output; calculate the peak shape of the matched filter output; and compare the shape with the shape of the template to calculate an uncertainty of the sub sample-based TOA estimate based on the peak shape of the matched filter output.

In another implementation, in applications in which the system does not execute super-resolution techniques, the system can set the sample-based uncertainty to equal the sampling period of the receiver.

7. Phase Difference Extraction

Generally, the system can calculate a phase-based TOA estimate for the ranging signal at the receiver based on the phase difference for each sub-signal in the set of sub-signals. More specifically, instead of calculating the TOA, $\tau_\phi$, for the received multicarrier at receiving device, m, via a single phase measurement (e.g., via the equation $\tau_\phi = \phi/2\pi f$, the system can instead calculate $\tau_\phi$ based on any two phase differences from any pair of sub-signals corresponding to subcarrier frequencies $n_1$ and $n_2$ in the set of sub-signals, N, as follows:

$$\tau_\phi = \frac{\phi_{n_2} - \phi_{n_1}}{2\pi(f_{n_1} - f_{n_2})} = \frac{\Delta\phi}{2\pi\Delta f}.$$

Thus, the system can calculate multiple estimates for $\tau_\phi$ based on the number of sub-signals in the set of sub-signals included in the ranging signal and can aggregate these estimates into a single phase-based TOA estimate, as described below.

8. Pair-Slope Time-of-Arrival Estimation

Generally, upon extracting the phase difference, $\Delta\phi$, and frequency difference, $\Delta f$, of each sub-signal pair in the set of sub-signal pairs of the ranging signal, the system can calculate a phase-based TOA estimate in Blocks S130, S132, S134, and S136. More specifically, the system can: calculate a maximum frequency difference, $\Delta f_{max}$, to determine a subset of the sub-signal pairs with which to calculate the phase-based TOA estimate in Block S130; and, for each sub-signal pair in this subset of sub-signal pairs, calculate a phase difference, $\Delta\phi$, of each sub-signal pair in Block S132, calculate a sub-signal TOA estimate in a set of sub-signal TOA estimates based on the phase difference corresponding to each sub-signal pair in Block S134, and calculate a phase-based TOA estimate based on a measure of central tendency of the set of sub-signal TOA estimates in Block S138. Thus, the system calculates a slope of a linear fit to the phase of each sub-signal against the corresponding set of sub-signal frequencies in order to identify a phase-based TOA estimate. Because, in the phase-based TOA estimate calculation, the system excludes sub-signal pairs characterized by frequency differences that result in a phase difference accumulation of greater than $2\pi$ radians, the system can avoid the $2\pi$ wrap-around effect that may prevent the usage of phase differences in calculating a TOA estimate.

In one implementation, the system can select a set of frequencies for the set of sub-signals with a $\Delta f$ based on the estimated range between the transmitter and receiver. For example, in response to estimating a larger range between receiver and transmitter, the system can decrease $\Delta f$ for the set of frequencies to reduce the effects of phase wrap-around. Alternatively, in response to estimating a shorter range between receiver and transmitter, the system can increase $\Delta f$ for the set of frequencies to increase measurement resolution for TOA. Thus, the system can calculate a precise phase-based TOA estimate by evaluating both closely spaced (in frequency) sub-signal pairs and larger spaced sub-signal pairs.

In order to calculate a maximum frequency difference for the subset of sub-signal pairs characterized by a total phase difference accumulation of less than $2\pi$ radians during transmission of the ranging signal, in one implementation the system can solve the equation, $$\Delta f_{max} = \frac{1}{\tau_{max}},$$

wherein $\tau_{max}$ is a maximum considered propagation time between the transmitter and the receiver. In particular, the system can: estimate a time-of-flight estimate of the ranging signal; and identify the subset of multiplexed sub-signals in the set of multiplexed sub-signals, the subset of multiplexed sub-signals characterized by a subset of frequencies in the set of frequencies, each frequency in the subset of frequencies defining a total phase accumulation of less than $2\pi$ radians for a duration of the time-of-flight estimate in Block S130. Thus, for any sub-signal pairs characterized by frequency differences less than the maximum frequency difference, the system predicts less than one cycle to occur during the TOF of the ranging signal. Additionally or alternatively, the system can calculate a rough TOF based on previous ranging calculations between the transmitter and the receiver, base station search area constraints, and/or signal strength measurements. In another implementation, the system can select sub-signal pairs characterized by frequencies less the $\Delta f_{max}$ by greater than a buffer frequency to provide a margin for the wrap-around frequency difference.

Once the system has isolated a subset of sub-signal pairs characterized by a frequency difference less than the maximum frequency difference, the system can generate a data pair representing the frequency difference, $\Delta f$, and phase difference, $\Delta \phi$, of each sub-signal pair in the subset of sub-signal pairs. In an ideal RF channel (with no noise, hardware impairments, or propagation-related multipath fading), the phase difference of each data pair directly corresponds to the propagation delay and/or physical the physical distance or electrical length between the transmitter and the receiver (assuming the system has successfully removed any sub-signals exhibiting greater than a $2\pi$ phase shift) and therefore the system can calculate the phase-based TOA estimate, $\tau_\phi$, by evaluating $$\tau_\phi = \frac{\Delta \phi}{2\pi \Delta f}$$

for any data pair ($\Delta f$, $\Delta \phi$). However, in a non-ideal RF channel, each data pair yields a different value for $\tau_\phi$. More specifically, the system can, for each sub-signal pair in the subset of multiplexed sub-signals: calculate a sub-signal pair time-of-arrival estimate based on the phase difference of the sub-signal pair in Block S134; and calculate a phase-based time-of-arrival estimate based on a measure of central tendency of the sub-signal pair time-of-arrival estimate for each sub-signal pair in the subset of multiplexed signals. For example, the system can: calculate a value for $\tau_\phi$ for each data pair in the set of data pairs; and calculate a mean or median value for $\tau_\phi$ across data pairs, thereby calculating a phase-based TOA estimate.

Alternatively, instead of calculating a mean or median of values for $\tau_\phi$, the system can calculate a weighted average that weighs $\tau_\phi$ derived from data pairs characterized by larger values of $\Delta f$ to mitigate the effects of phase delay bias on the value of $\tau_\phi$.

8.1 Uncertainty Estimation

Generally, the system can also calculate a phase-based uncertainty, $\delta_\theta$ for the phase-based TOA estimate, $\tau_\phi$, in order to inform the calculation of the hybrid TOA estimate. More specifically, the system can calculate a phase-based uncertainty based on a variability measure of the set of sub-signal pair TOA estimates in Block S138. Thus, the system can apply weight to the phase-based TOA estimate based on the repeatability of the sub-signal pair TOA estimates when calculating the hybrid TOA estimate.

In one implementation, the system can calculate the phase-based uncertainty by calculating the standard deviation or the root mean square deviation of the value of $\tau$ across the set of data pairs (i.e., a function of the residuals of each data pair). Thus, the system can calculate the phase-based uncertainty based on the distribution of the value of $\tau$ relative to the phase-based TOA estimate.

9. MUSIC Time-of-Arrival Estimation

Generally, the system can calculate a phase-amplitude TOA estimate, $\tau_{\phi,A}$, and identify a set of multipath components of the ranging signal. More specifically, the system can: execute a multiple signal classification algorithm to detect a set of multipath components of the ranging signal in Block S140; and calculate a phase-amplitude-based TOA estimate based on the set of multipath components of the ranging signal in Block S142. In particular, the system can calculate a third TOA estimate, further improving the hybrid TOA estimate and characterizing the multipath environment of the RF channel of the ranging signal.

In particular, the system can: generate a received ranging signal vector of complex amplitudes derived from sample-based correlation and/or subcarrier phase measurement; calculate an autocorrelation matrix of the received ranging signal vector; for each frequency in the set of frequencies, calculate an eigenvector of the autocorrelation matrix and a corresponding eigenvalue of the autocorrelation matrix; sort the eigenvector for each frequency in the set of frequencies based on the corresponding eigenvalue for each frequency in the set of frequencies to identify a noise subspace of eigenvectors and a signal subspace of eigenvectors; evaluate an estimation function over a range of possible times-of-arrival based on the noise subspace of eigenvectors and a steering vector; and identify peaks of the estimation function as the set of multipath components of the ranging signal, each multipath component in the set of multipath components corresponding to a multipath time-of-arrival. This process is described in further detail below.

Figure 2:
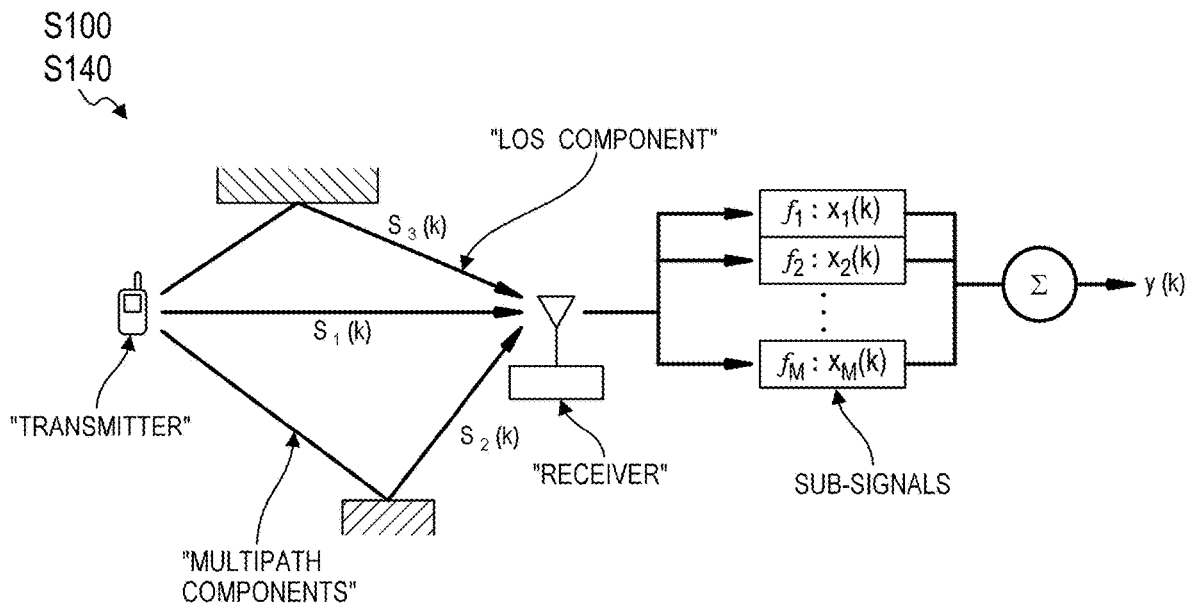
FIG. 2 is a schematic representation of one variation of the method.

The system applies the MUSIC algorithm (often used for angle-of-arrival detection) to the TOA calculation and multipath characterization according to the receiver and signal model shown in FIG. 2. In FIG. 2: each multipath component of the signal is represented as $s_i(k)=\alpha_i(k)e^{j2\pi f \tau_i}$ with received TOAs $\tau_i$ for $i \in \{1, \ldots, D\}$, wherein D represents the number of multipath components and k represents the digital sample of the ranging signal; the received ranging signal vector, x(k) is captured for M sub-signals with different frequencies and is represented as $\vec{x}(k)=[x_1(k), x_2(k), \ldots, x_M(k)]^T$. Additionally, the system executes the MUSIC algorithm based on the steering matrix, A describing each multipath component with TOA $\tau$ in terms of a composition of sub-carrier signals:

$$A=[\alpha(\tau_1),\tau(\tau_2), \ldots, \alpha(\tau_D)],$$

wherein $\alpha(\tau_i)=[1, e^{j2\pi \Delta f \tau_i}, \ldots, e^{j2\pi(M-1)\Delta f \tau_i}]^T \in R^M$, and $\Delta f$ is the difference between two consecutive frequencies. Based on the above described receiver and signal model:

$$\vec{x}(k)=A(\tau)\vec{s}(k)+\vec{n}(k),$$

wherein $\vec{s}(k)=[\alpha_1(k)e^{j2\pi f_0 \tau_1}, \alpha_2(k)e^{j2\pi f_0 \tau_2}, \ldots, \alpha_D(k)e^{j2\pi f_0 \tau_D}]^T \in R^D$ represents the signal vector and $\vec{n}(k)$ represents the noise within each sub-signal of the ranging signal.

The system then computes the following autocorrelation matrix:

$$R_{xx}=E(\vec{x}\vec{x}^H),$$

wherein $x^{\rightarrow H}$ represents the conjugate transpose of $x^{\rightarrow}$ and E represents an expected value function equivalent to a statistical average over the elements of its input.

Once the system has computed $R_{xx}$, the system calculates the eigenvectors $v_i \in R^M$ for $i \in \{1, \ldots, M\}$ and corresponding eigenvalues of $R_{xx}$ and sorts the eigenvectors in descending order of the corresponding eigenvalues. Based on an estimation of the number of multipath signals, the system then separates the eigenspace of $R_{xx}$ into a signal subspace $Q_s=[v_1, v_2, \ldots, v_D]$ and a noise subspace, $Q_n=[v_{D+1}, v_{D+2}, \ldots, v_M]$. Because steering vector $\alpha(\tau)$ at the true multipath delays spans the signal subspace, it is orthogonal to the eigenvector in the noise subspace, i.e., $\alpha(\tau)^H v_i=0$ for $i \in \{D+1, \ldots, M\}$. Hence, by evaluating the MUSIC estimation function, $P_{MU}(\tau)$, over a range of discrete values of $\tau$, the system can generate a pseudospectrum, and identify the peaks in this spectrum as the TOAs of each multipath component of the signal, as follows:

$$P_{MU}(\tau) = \frac{1}{\sum_{i=D+1}^{M} |a(\tau_i)^H v_i|^2}$$

Upon generating the MUSIC pseudospectrum, the system can select an earliest multipath component in the set of multipath components based on the multipath time-of-arrival of each multipath component. More specifically, the system can then select the minimum TOA represented in the peaks of the pseudospectrum as the LOS ("line of sight") TOA ("time of arrival") to calculate the phase-amplitude-based TOA estimate, $\tau_{\phi,A}$.

In applications in which the system executes TDOA localization based on reception of the ranging signal by multiple receivers, the system can calculate the MUSIC estimation function $P_{MU}(\Delta\tau)$ based on the phase difference-of-arrival value instead of the phase-of-arrival value. In this implementation, the system can filter the many peaks in the $P_{MU}(\Delta\tau)$ generated due to the various combinations of multipath components received at a pair of receivers and select those peaks closest to the phase-based TOA estimate, $\tau_\phi$. Alternatively, the system can apply a set of geometric conditions based on the multipath components generated via execution of the MUSIC algorithm to identify a TDOA estimate that best fits a known geometry of a mesh network of transceivers, as is further described below. Thus, the system can reject $\Delta\tau$ between multipath components measured at distinct receivers.

9.1 Multipath Severity Estimation

Generally, the system can calculate a parameter representing the severity of the multipath within the RF channel in order to inform the combination of TOA estimates when calculating the hybrid TOA estimate. More specifically, the system can calculate a multipath metric (e.g., a Rician K-factor, delay spread, and/or angle spread), in Block S144, that characterizes the severity of multipath within the ranging signal channel, such as by comparing a power of a line-of-sight component and power of the non-line-of-sight components in the set of multipath components. Thus, the system can weigh the contribution of the phase-based TOA estimate relative to the phase-amplitude-based TOA estimate when calculating a hybrid TOA estimate for the ranging signal.

In one implementation, the system calculates a Rician K-factor based on the eigenspace of the $R_{xx}$ matrix. Thus, the system can calculate a parameter that compares the relative power of the LOS multipath component with power of other multipath components of the system, thereby characterizing the multipath severity within the RF channel of the ranging signal.

10. Signal Strength-Based TOA Estimation and Ranging

Figure 7:
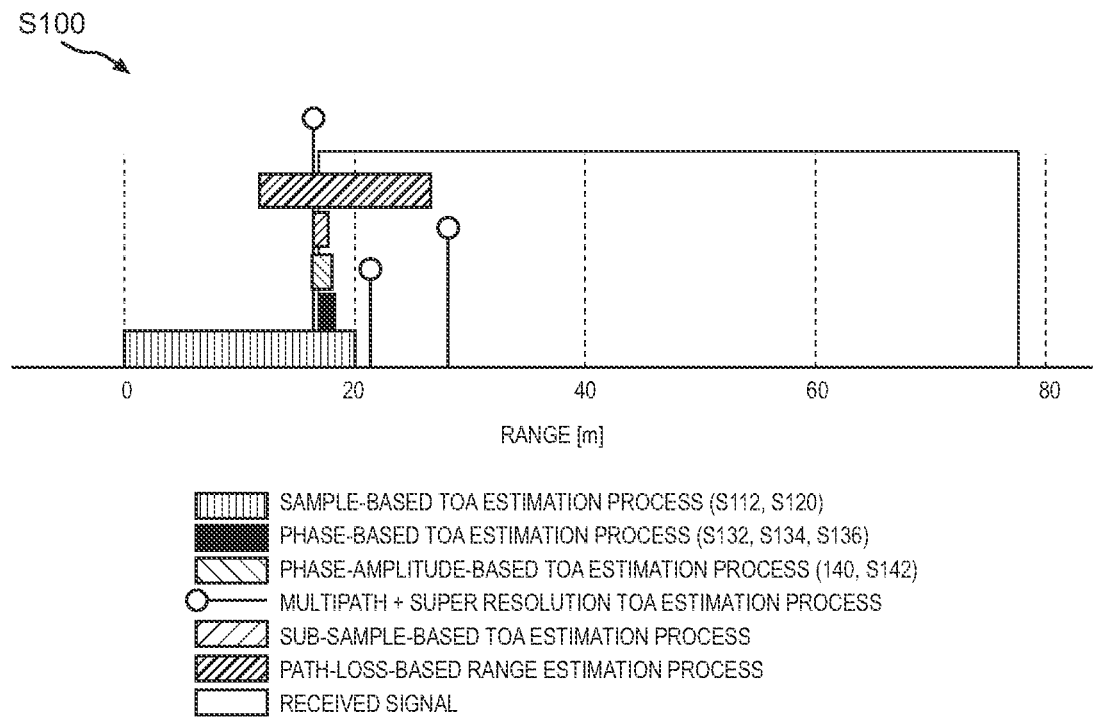
FIG. 7 is a schematic representation of one variation of the method.
Figure 8:
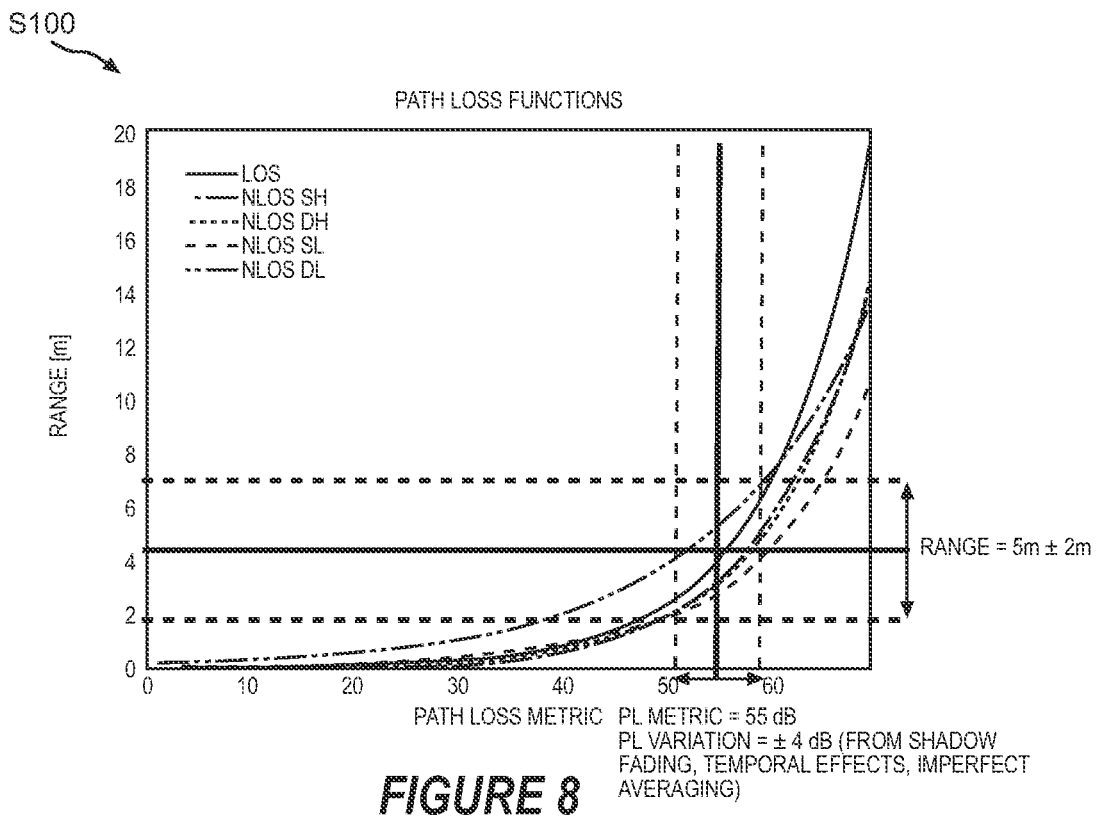
FIG. 8 is a schematic representation of one variation of the method.

Generally, the system can detect power loss of a ranging signal following transmission of the ranging signal by a transmitter of a first node in the wireless communication network. As shown in FIG. 7, in one implementation, the system can compute a signal reception strength characterizing a relationship between the power of the ranging signal received at the receiver of a second node (e.g., mobile device) and the distance between the first node and the second node. For example, the system can compute the signal reception strength, $P_{RX}$, in dB, based on the power of the ranging signal received at the receiver, defining a logarithmic relationship between the signal strength and the distance between the transmitter and the receiver according to:

$$P_{RX}=P_{TX}+G_{TX}+G_{RX}+PG+SF=n*10*\log_{10}(R[m])+b+SF$$

where $P_{TX}$ is the transmitted power (e.g., in dB), $G_{TX}$ is the transmitter antenna gain (e.g., in dBi), $G_{RX}$ is the receiver antenna gain (e.g., in dBi), PG is the path gain based on the distance (e.g., in dB)—the inverse of path loss (e.g., PG=−1*PL), SF is a shadow fading parameter (e.g., in dB), b is a constant representation of $P_{TX}$, $G_{TX}$, $G_{rX}$, PG (e.g., in dB), n is the path gain exponent (e.g., −2 in free space). In this example, the first node, in a population of nodes, can broadcast a ranging signal to a set of nodes. A second node in the node group can receive the ranging signal transmitted by the first node. In this example, the system can then, based on ranging signal: identify a transmission power of the ranging signal at the receiver of second node; and derive a signal strength metric for the ranging signal based on the transmission power. Thus, based on the signal reception strength, the system can compute a signal strength-based TOA of the ranging signal at the second node. Then, based on the signal strength-based TOA, the system can compute a signal strength-based range specifying a distance between the node and the mobile device.

As shown in FIGS. 10A-10C, in one implementation, at a first time, the system can calculate a first range estimate by executing one or more TOA estimation processes, such as sample-based TOA estimation process, phase-amplitude-based TOA estimation process, and/or sub-sample-based TOA estimation process. In this example, at a second time, the system can calculate a signal strength-based range estimate by executing the signal strength-based range estimation process in response to the first range estimate falling within a target range or falling below a target threshold. Then, the system can calculate the hybrid range estimate based on the signal strength-base range estimate and any other range estimate computed for the ranging signal. Therefore, in response to a first range estimate falling within a target range associated with accurate strength-based range estimation, the computer system can calculate the signal strength-based range estimate to improve the hybrid range estimate. However, in response to the first range estimate exceeding the target range associated with accurate strength-based range estimation, the system can avoid calculating the signal strength-based range estimate to maintain a high accuracy of the hybrid TOA estimate.

10.1 Path Loss-Based TOA Estimation and Ranging

As shown in FIG. 7, in one implementation, the system can compute a signal strength-based range (e.g., distance between the transmitter and receiver) based on the signal strength parameter and a path loss (hereafter "PL") metric according to a set of PL functions (e.g., models). The system can also compute a signal strength-based TOA of the ranging signal based on the signal strength-based range. More specifically, the system can compute a PL metric based on signal transmission strength at the transmitter, characterized by a power of the ranging signal, and the signal reception strength at the receiver. The system can then estimate the signal strength-based range based on a set of line-of-sight (hereafter "LOS") and non-line-of-sight path loss (hereafter "NLOS") functions. In one variation, the system can characterize NLOS functions based on a sparse (hereafter "S") or dense (hereafter "D") cluster or distribution of receivers (e.g., mobile devices) within the environment and based on a high (hereafter "H") or low (hereafter "L") location of a node (e.g., a base station) relative to the environment. For example, a first node can: broadcast a ranging signal from the transmitter; at the transmitter, measure the signal transmission strength of the ranging signal; access the signal reception strength of the ranging signal at the receiver of a second node; and compute a path loss metric based on the signal transmission strength and the signal reception strength.

Thus, as shown in FIG. 7, the system can estimate signal strength-based ranges based on the LOS function, and the NLOS functions—"NLOS SH," "NLOS DH," "NLOS SL," and "NLOS DL"—to represent effects (e.g., signal degradation) of LOS and NLOS characteristics on range and path loss results. Therefore, the system can: at a first time, localize positions (e.g., initial positions) of a set of nodes (e.g., mobile devices) deployed within the target environment based on corresponding ranges between the first node and each node in the set of nodes; and, during a second time, identify differences in positions of the mobile devices based on corresponding signal strength differences according to a set of PL functions.

In one variation, as shown in FIG. 7, the system can include variation in PL metric computation due to environmental factors (e.g., shadow fading, ambient temperature, averaging estimates). The system can then filter (or remove) the variation associated with power of the ranging signal at the receiver to compute a signal strength-based (e.g., path loss-based) range. For example, the system can: based on the set of PL functions, compute a set of PL function probabilities that the path loss metric associated with the ranging signal is analogous to each PL function; compute a first weighted average range estimation for the path loss metric, based on the set of PL function probabilities; compute a confidence score for the first weighted average range estimation descriptive of the path loss metric; and compute a threshold range (e.g., a maximum and a minimum) for the path loss metric based on the confidence score and the PL functions. In response to the first weighted average range estimation falling outside the threshold range, the system can: compute a second weighted average range estimation based on the set of PL function probabilities; and filter or remove range estimation outliers based on the second weighted average range estimation (e.g., range estimates that do not fall within the threshold range).

As shown in FIGS. 10A-10C, in one implementation, at a first time, the system can calculate a first range estimate by executing one or more TOA estimation processes, such as sample-based TOA estimation process, phase-amplitude-based TOA estimation process, and/or sub-sample-based TOA estimation process. In this example, at a second time, the system can calculate a path loss-based range estimate by executing the path loss-based range estimation process in response to the first range estimate falling within a target range or falling below a target threshold. Then, the system can calculate the hybrid range estimate based on the signal strength-base range estimate and any other range estimate computed for the ranging signal. Therefore, in response to a first range estimate falling within a target range associated with accurate strength-based range estimation, the computer system can calculate the path loss-based range estimate to improve the hybrid range estimate. However, in response to the first range estimate exceeding the target range associated with accurate strength-based range estimation, the system can avoid calculating the path loss-based range estimate, as the path loss-based range estimate may not be accurate.

11. Sub-Sample Ranging Estimation

In one implementation, the system can compute a sub-sample-based TOA estimation by computing a correlation (e.g., complex correlation) between a ranging signal (e.g., sampled ranging signal) at the receiver and a target (e.g., expected) ranging signal. For example, the system can: estimate a time-of-arrival of the ranging signal at the receiver by computing a correlation peak (e.g., a Zadoff Chu correlation peak) with sample resolution; and then use a discriminant function $$(\text{e.g., } T(d) = T(\frac{\text{late} - \text{early}}{\text{prompt}})),$$

which is the function of the ranging signal (e.g. a Zadoff Chu signal), to estimate the exact location of the peak by adding T (d) to the time of correlation peak with sample resolution to find the time of arrival.

12. Sparse Channel Reconstruction Via L1-Norm Regularization

In one implementation, the system can compute a sparse reconstruction of the wireless channel including the line-of-sight and multipath delays for TOA estimation. For example, the second node can receive a set of ranging signals at different frequencies (e.g., based on a carrier frequency hopping scheme and/or multi-subcarrier modulation). In this implementation, the system can represent the ranging signal, h, via a matrix representation:

$$h = \begin{bmatrix} h_0, & \dots & h_{N_f} \end{bmatrix}^T = \begin{bmatrix} a_0 a_1 & \dots & a_{L_p-1} \end{bmatrix} \begin{bmatrix} \alpha_0, & \dots & \alpha_{L_p-1} \end{bmatrix}^T + n$$

where $N_f$ is a number of frequency hops; $\alpha_j$ are complex channel coefficients (e.g., $\alpha_0 = |\alpha_0|e^{j\varphi_0}$ represents a line-ofsight path of the ranging signal to the receiver, and $a_i = |\alpha_i|e^{j\varphi_i}$ represents multipath components of the ranging signal), n is a complex noise vector, and $\alpha_j$ is a complete steering vector:

$$a_j = \left[ e^{j2\pi f_0 \tau_j} e^{j2\pi (f_0 + \Delta f)\tau_j} \ldots e^{j2\pi (f_0 + (M-1)\Delta f)\tau_j} \right]^T \in \mathbb{R}^{N_f}.$$

The system can then identify a subset of $\alpha_j$ that are negligible (e.g., zero) and compute a sparse solution (e.g., to reject outliers) for the following loss function:

$$\mathrm{Min} \| h - [a_0 \alpha_1 \ldots a_{L_p-1}][\alpha_0, \ldots \alpha_{L_p-1}]^T \| + \lambda |[\alpha_0, \ldots \alpha_{L_p-1}]^T|$$

based on a regularization technique (e.g., L1-norm regularization) according to the subset of $\alpha_j$ that are not negligible. The system can solve (or compute) the optimization function based on convex optimization techniques to return a unique solution in polynomial time. In one example, the system can first compute a pair-slope-based TOA estimate based on a pair-slope method (e.g., phase-based TOA estimation method). Then, based on the pair-slope-based TOA estimate, the system can limit the solution space for the optimization. More specifically, the system can compute an initial estimate of the TOA based on a pair-slope computation, as described in U.S. patent application Ser. No. 17/511,433. The system can then reduce a search space within the estimate of the TOA for a grid where the system can optimize the loss function. Thus, by limiting (or reducing) the search over discrete TOA estimates, the system can increase accuracy of computing ranging estimation and reduce computational resources (e.g., computation time) in computing the sparse channel reconstruction.

13. Example: Hybrid TOA Estimation Process

As shown in FIGS. 5, 6, and 10A-10C, in one implementation, the system can access a ranging signal and, at a first time: calculate a phase-based TOA estimate; detect a set of multipath components characteristic of the second ranging signal based on a signal classification function; calculate a phase-amplitude-based TOA estimate based on the set of multipath components characteristic of the second ranging signal; and calculate a sub-sample-based TOA estimate. Therefore, the system can initially calculate a set of TOA estimates by executing TOA estimation processes associated with relatively high ranging precision.

In this implementation, during a second time succeeding the first time, the computer system can: based on the set of multipath components characteristic of the first ranging signal, calculate a multipath metric characterizing a power ratio between a line-of-sight component and non-line-of-sight components in the set of multipath components of the second ranging signal; and, in response to the multipath metric indicating a strong multipath environment between the transmitter and the receiver, calculate a sample-based TOA estimate. Then, based on the sample-based TOA estimate, the system can identify a possible outlier among the phase-based TOA estimate, phase-amplitude-based TOA estimate, and the sub-sample-based TOA estimate. For example, in response to a difference between the sample-based TOA estimate and the sub-sample-based TOA estimate exceeding a threshold difference, the computer system can identify the sub-sample-based TOA estimate as the outlier and exclude it from the hybrid TOA estimate calculation. Alternatively, the computer system can calculate the hybrid TOA based on the sample-based TOA estimate, the sub-sample-based TOA estimate, the phase-based TOA estimate, and the phase-amplitude TOA estimate. Therefore, in response to detecting the strong multipath environment, the system can calculate the sample-based TOA estimate to improve the hybrid TOA estimate, as the sample-based TOA estimation method is associated with a high resilience to strong multipath environments.

Additionally, or alternatively, during a second time succeeding the first time, the computer system can calculate a signal strength-based range estimate in response to one of the sub-sample TOA estimate, the phase-based TOA estimate, and the phase-amplitude-based TOA estimate falling within a target range associated with an accurate signal strength-based range estimation. Then, based on the signal-strength-based range estimate, the system can calculate a signal strength-based TOA estimate. Based on the signal strength-based TOA estimate, the system can: identify a possible outlier among the phase-based TOA estimate, phase-amplitude-based TOA estimate, and the sub-sample-based TOA estimate; or calculate the hybrid range estimate based on the signal strength-base TOA estimate, the phase-based TOA estimate, phase-amplitude-based TOA estimate, and the sub-sample-based TOA estimate. Therefore, in response to a first range estimate falling within a target range associated with accurate strength-based range estimation, the computer system can calculate the signal strength-based range estimate to improve the hybrid range/TOA estimate.

14. Defining a Hybrid TOA/Range Estimation Process

In one implementation, a first node, in a population of nodes, can broadcast a first ranging signal (e.g., a test ranging signal) to a set of receivers (e.g., mobile devices). Each mobile device in a mobile device group can receive this test ranging signal transmitted by the node. In one variation, a set of nodes can broadcast a first ranging signal to a first mobile device. In another variation, the first mobile device can broadcast the first ranging signal to a first node in a set of nodes. In yet another variation, the first mobile device can broadcast the first ranging signal to the set of nodes.

A system can then execute a set of TOA estimation processes based on the test ranging signal. Thus, the system can compute a first set of initial TOA estimates for each mobile device in the mobile device group deployed in the target environment for subsequent localization and ranging. Upon computing the first set of initial TOA estimations, the system can compute a range estimate corresponding to each TOA estimate in the first set of initial TOA estimates. Therefore, herein "range" and "TOA" can be used interchangeably.

The system can then combine results of each TOA estimation process for each individual mobile device (or subgroup, cluster, or all mobile devices in the mobile device group)—based on performance parameters derived from these TOA estimation processes executed for these individual mobile devices—to generate a hybrid TOA estimation process for each mobile device in the mobile device group. More specifically, the system can isolate a subset of these TOA estimation processes for a particular mobile device, define parallel and/or serial combinations of results of these TOA estimation processes that yield a combination of processes (hereafter "hybrid TOA estimation configuration") for the mobile device, store a model for this combination in a hybrid TOA estimation process, and assign the hybrid TOA estimation process to the particular mobile device.

For example, during a hybrid range configuration period, the first node in the population of nodes can broadcast a second ranging signal to each mobile device in the mobile device group. In this example, based on the second ranging signal received at each mobile device in the mobile device group, the system can execute the set of TOA estimation processes to compute a second set of TOA estimates for each mobile device in the mobile device group. The system can then assign TOA estimation performance scores to each TOA estimation process relative to the first set of initial TOA estimates. More specifically, the performance scores can be descriptive of performance metrics, such as: computational expenditure; localization precision; localization speed; and/or a resistance to multipath interference. The system can then derive a hybrid TOA estimation configuration for each mobile device in the mobile device group based on the TOA estimation performance scores. In this example, the hybrid TOA estimation configuration can: specify a unique combination of a subset of the set of TOA estimation processes; and define an execution schedule specifying how results of these processes are combined, such as in series or parallel. For example, for a first mobile device, the first hybrid TOA estimation configuration can include: execution of a sub-sample-based process, a phase-based process, and a sample-based TOA estimation process in series (e.g., feeding results from an estimation process into a proceeding process). For a second mobile device, a second hybrid TOA estimation configuration can include: execution of a subsample-based process; a phase-based TOA estimation process; a sample-based TOA estimation process in parallel (e.g., contemporaneously); and computation of a combination (e.g., a weighted average) of the three resulting TOA estimates to derive a distance between the first node and the second mobile device. Thus, the system can combine TOA estimation methods to generate hybrid TOA estimates for individual mobile devices for localization of the mobile devices within the target environment. Therefore, the system can generate hybrid TOA estimation processes that increase localization speed, reduce computational resources associated with TOA estimation, and increase precision of TOA estimates (e.g., by reducing uncertainty and outlier influence).

Later, during a ranging period, the system can reallocate (e.g., add or remove) TOA estimation processes to and from hybrid TOA estimation configurations for individual mobile devices based on subsequent performance thresholds derived or tracked for each mobile device in the mobile device group. For example, for a first mobile device in the mobile device group, the system can execute a first hybrid TOA estimation configuration according to a first execution schedule associated with the first mobile device to compute a first set of TOA estimates. In this example, the system can derive a second hybrid TOA estimation configuration for the first mobile device based on the TOA estimation performance scores, in response to a first TOA estimation performance score for a first TOA estimation falling below a threshold score. For example, in response to detecting that a performance score (e.g., "0.5") for ranging precision (e.g., range estimation precision, TOA estimation precision) for a phase-amplitude TOA estimation process fell below a ranging precision threshold score (e.g., "1.0"), the system can remove this process from the hybrid TOA estimation configuration for the first mobile device. The system can then repeat a hybrid TOA estimation configuration process for the first mobile device (and the other mobile devices in the mobile device group) to derive new hybrid configurations. Thus, based on the target environment (e.g., a warehouse, a grocery store) of the mobile device group, the system can balance computational expenditure associated with TOA estimation, ranging precision, and speed of estimation to derive target hybrid configurations.

14.1 Configuration Process Setup: Initial TOA Estimation

In one implementation, the system can execute the set of TOA estimation processes to capture initial TOAs of a ranging signal of each node in a set of nodes, in a wireless communication network. Based on the initial TOAs, the system can compute a set of ranges of the set of nodes. For example, the system can execute the set of TOA estimation processes to calculate ranges of mobile devices in the mobile device group deployed in the target environment. More specifically, the system can execute a set (e.g., all) of the TOA estimation processes including: sample-based; phase-based; phase-amplitude-based (e.g., super-resolution); signal strength-based; sub-sample-based; and sparse multipath-based TOA estimation processes, to compute TOAs (or ranges) for each node in a set of nodes. The system can then record a set of performance metrics for each TOA estimation process, such as: a computational load associated with each TOA estimation process; and/or a TOA estimation duration.

For example, at a first time during a setup period, a first node can broadcast a first ranging signal (e.g., a test ranging signal) to a set of mobile devices in a mobile device group deployed in a target environment. The system can then: execute a set of TOA estimation processes for each mobile device based on the first ranging signal; compute an initial TOA estimate for each mobile device in the mobile device group based on each TOA estimation process and the ranging signal; and characterize performance metrics for each TOA estimation process in the set of TOA estimation processes. Therefore, the system can compute a set of initial TOAs associated with the mobile devices in the mobile device group deployed in the target environment and performance metrics of each TOA estimation process for subsequent ranging of the mobile devices in the mobile device group deployed within the target environment.

14.2 Threshold Derivation

In one implementation, the system can define performance thresholds for each TOA estimation process in the set of TOA estimation processes. For example, for each group of nodes in the wireless communication network, the system can derive performance thresholds, such as: a ranging precision threshold (e.g., within 0.5 m); a multipath resilience threshold (e.g., 0.70); a TOA estimation computation speed threshold (e.g., within 1 millisecond); and/or a computational complexity (e.g., a power consumption metric), for each TOA estimation process (e.g., relative to the set of initial TOAs). Thus, the system can compare TOA estimation results to the performance thresholds for each TOA estimation process to evaluate performance of each TOA estimation process to define a hybrid (e.g., combined) TOA estimation configuration based on performance of each individual TOA estimation process.

14.3 Hybrid TOA Estimation Configuration

As shown in FIG. 9, for each node in the set of nodes, the system can assign TOA estimation performance scores—descriptive of performance metrics associated with each TOA estimation process in the set of TOA estimation processes—to each TOA estimation process based on the first set of TOA estimates. In this example, the system can then assign TOA estimation performance scores to each TOA estimation process relative to the first set of initial TOA estimates. More specifically, the performance scores can be descriptive of performance metrics, such as: ranging precision; resistance to multipath interference; computational complexity; and/or a target range. In particular, the system can assign a TOA estimation performance score to each performance metric for each TOA estimation process. For example, in response to computing consistent TOA estimates across instances of time, the system can assign a performance score of "5" to the TOA estimation process. In this example, in response to computing inconsistent TOA estimates (e.g., computing outliers) across instances of time, the system can assign a performance score of "1" to the TOA estimation process for ranging precision (e.g., TOA estimation precision, range estimation precision).

In another example, the system can assign a performance score to each TOA estimation process based on a resistance to multipath interference. As shown in FIG. 9, upon executing the phase-based, and/or the subsample-based process, the system can compute outlier estimates based on multipath interference. Thus, the system can assign a performance score of "1" to the TOA estimation processes for multipath resilience.

In another example, the system can assign a performance score to each TOA estimation based on a computational complexity (e.g., a time complexity) of the TOA estimation process. More specifically, the system can compute a computational complexity metric for each TOA estimation process according to a least squares regression operation. For example, as shown in FIG. 9, the system can characterize the phase-amplitude-based process with a high computational complexity (e.g., performance score of "5") relative to the other processes. Thus, the system can derive a unique hybrid TOA estimation configuration based on a target resistance to multipath signal interference.

In another example, the system can assign a performance score to each TOA estimation/ranging process based on a target localization range. For example, in response to estimating ranges that are below a threshold range (e.g., within 20 m) according to the ranging process, the system can assign a performance score of "5" to the ranging process. In this example, as shown in FIG. 9, the system can compute ranging/TOA estimates for a set of mobile devices according to the signal strength-based ranging process to localize the set of mobile devices within loom. Thus, the system can derive a unique hybrid TOA estimation configuration including the sample-based, phase-based, phase amplitude-based, and/or subsample-based process when a target localization range is within the 20-meter threshold range.

14.4 Configuration Derivation

In one implementation, the system can derive a unique hybrid TOA estimation configuration based on the performance scores. For example, for each mobile device in the mobile device group, the system can derive a hybrid TOA estimation configuration—including a unique combination of a subset of the set of TOA estimation processes—based on the TOA estimation performance scores; and, for each mobile device in the mobile device group, define an execution schedule specifying an order of TOA estimation process execution based on the hybrid TOA estimation configuration. More specifically, the hybrid TOA estimation configuration can: specify a unique combination of a subset of the set of TOA estimation processes; and define an execution schedule specifying how results of these processes are combined, such as in series, or parallel.

For example, for a first mobile device, the first hybrid TOA estimation configuration can include: execution of a subsample-based process, a phase-based process, and a sample-based TOA estimation process in series (e.g., feeding results from an estimation process into a proceeding process); for a second mobile device, a second hybrid TOA estimation configuration can include execution of a subsample-based process, a phase-based TOA estimation process, and a sample-based TOA estimation process in parallel (e.g., contemporaneously); and computation of a combination (e.g., a weighted average) of the three resulting TOA estimates to derive a hybrid TOA estimate (or distance) between the first node and the second mobile device. In another example, a third hybrid TOA estimation configuration can include: execution of a first TOA estimation process (e.g., signal strength-based), execution of a second TOA estimation process (e.g., subsample-based) based on results of the first TOA estimation process; and execution of a third TOA estimation process (e.g., vector-based); and combination (e.g., a weighted average) of the results of the second and third TOA estimation processes. The system can then compute a hybrid TOA estimation between the first node and the mobile device based on the combination of results of two TOA estimation processes. Therefore, the system can combine TOA estimation methods to generate hybrid TOA estimates for individual mobile devices for localization of the mobile devices within the target environment. Therefore, the system can generate hybrid TOA estimation processes that increase localization speed, reduce computational resources associated with ranging and TOA estimation, and increase precision of TOA and ranging estimates (e.g., by reducing uncertainty and outlier influence).

14.5 Process Target Application

In one implementation, the system can derive a hybrid TOA estimation configuration based on a target application. As shown in FIG. 9, the system can derive the hybrid TOA estimation configuration based on a target application associated with each TOA estimation process, such as: measurement consistency verification (e.g., "limit"); precision ranging and/or proximity estimation. For example, the system can include a TOA estimation process, such as: the sample-based process; and/or the signal strength-based process, in the hybrid TOA estimation configuration—each characterized by a low ranging precision (e.g., precision score of "1")—to verify, or measure, consistency across TOA estimates. In another example, the system can include a TOA estimation process, such as: the phase-based process; the phase amplitude-based and/or the subsample-based process, in the hybrid TOA estimation configuration for localization of each mobile device (or node) within a target resolution (e.g., on the order of 1 meter). In yet another example, the system can include the signal strength-based process in the hybrid TOA estimation configuration to estimate the proximity of a transmitter (e.g., a node) relative to a receiver (e.g., a mobile device).

14.6 Hybrid Process Update Automation

In one implementation, the system can automatically re-allocate (e.g., add or remove) TOA estimation processes to and from hybrid TOA estimation configurations for individual mobile devices based on subsequent performance thresholds derived or tracked for each mobile device in the mobile device group. For example, during a ranging period, the system can: for each mobile device in the mobile device group, execute the hybrid TOA estimation configuration according to the execution schedule specifying execution of the subset of TOA estimation processes in parallel or in series, to compute a set of TOA estimates. During the ranging period, the system can access process performance scores for each TOA estimation process associated with the hybrid TOA estimation configuration based on performance (e.g., computational speed, ranging accuracy, computational expenditure, multipath resilience) of each TOA estimation process. In response to the set of TOA estimation performance scores for the set of TOA estimates falling below threshold scores, the system can update the hybrid TOA estimation configuration based on the TOA estimation performance scores that exceed threshold scores. For example, in response to detecting that a performance score (e.g., "0.3") for ranging precision for a phase-amplitude TOA estimation process falls below a ranging precision threshold score (e.g., "1.0"), the system can remove the phase-amplitude TOA estimation process from the hybrid TOA estimation configuration for the first mobile device. The system can then repeat a hybrid TOA estimation configuration process for the first mobile device to derive a new hybrid configuration for subsequent ranging of the first mobile device during a second ranging period. Therefore, the system can dynamically adjust hybrid TOA estimation configurations for mobile device groups and/or individual mobile devices based on performance of the hybrid TOA estimation configuration during a ranging period.

14.7 Hybrid TOA estimation Configuration: Examples

Generally, the system can define hybrid TOA estimation configurations based on a target environment (e.g., a warehouse, a grocery store) and characteristics of mobile device groups (e.g., frequent movement within target area, priority of asset type). The system can also define hybrid TOA estimation configurations based on target error types (e.g., presence of range/TOA estimate outliers, presence of 2πF ambiguity, presence of multipath interference) to resolve error types.

In one example, the system can derive a TOA estimation for the hybrid TOA estimation configuration by computing a phase-based or subsample-based TOA estimation, in response to detecting a multipath signal strength falling below a multipath threshold (e.g., negligible). In another example, the system can: derive a TOA estimation by computing a super-resolution (e.g., MUSIC-based, phase-amplitude-based) estimation, in response to detecting a multipath signal strength exceeding a multipath threshold.

In one example, the system can define a hybrid TOA estimation configuration based on the subsample-based TOA estimation process and the phase-based process. For example, the system can: execute the subsample-based process; and, based on the results of the subsample-based process, compute the phase-based TOA estimation process to derive a hybrid TOA estimate for a ranging signal received at the mobile device. Thus, the system can reduce $2\pi$ ambiguity in the TOA estimate by combining the subsample-based and phase-based processes.

In another example, the system can: define a hybrid TOA estimation configuration based on any TOA estimation process and the sample-based process. For example, the system can: select a TOA estimation process from the set of TOA estimation processes; and, based on the results of the TOA estimation process, compute the sample-based TOA estimation to derive a hybrid TOA estimate for a ranging signal. More specifically, the system can reject signal strength measurements (e.g., signal strength-based range/TOA estimates) that are inconsistent with target signal power levels based on the signal strength-based process (e.g., according to a Received Signal Strength Indicator). Thus, the system can reduce and/or eliminate variance in the range/TOA estimate based on outliers or extraneous estimates.

15. Weighted Time-of-Arrival Estimation

Generally, the system can calculate a hybrid TOA estimate as a weighted combination of the sample-based TOA estimate, the phase-based TOA estimate, and/or the phase-amplitude-based TOA estimate based on the sample-based uncertainty, the phase-based uncertainty, and the multipath metric in Block S15o. More specifically, the system can: calculate a weighted combination of the phase-based TOA estimate and the phase-amplitude based TOA estimate, wherein the system calculates the weights of the phase-based TOA estimate and the phase-amplitude-based TOA estimate based on a multipath metric; compare this weighted combination against the sample-based TOA estimate and sample-based uncertainty; and, in response to detecting that the weighted combination falls within the sample-based uncertainty interval, select the weighted combination as the hybrid TOA estimate. Alternatively, in response to detecting that the weighted combination falls outside of the sample-based uncertainty interval, the system can select the sample-based TOA estimate as the TOA estimate. Thus, the system weights the combination of the phase-based TOA estimate and the phase-amplitude-based TOA estimate based on the system's characterization of the multipath environment.

Generally, the system calculates the weighted combination as a weighted average of the phase-based TOA estimate and the phase-amplitude-based TOA estimate, wherein the system decreases the weight of the phase-based TOA estimate relative to the phase-amplitude-based TOA estimate in response to detecting strong multipath components of the ranging signal (i.e., a lower value of the Rician K-factor multipath metric) and increases the weight of the phase-based TOA estimate relative to the phase-amplitude-based TOA estimate in response to detecting weak multipath components of the ranging signal (i.e., a higher value of the multipath metric). Thus, in view of a strong multipath environment, the system prioritizes the value of the phase-amplitude-based TOA estimate, which is more robust to multipath fading, and, in view of a weak multipath environment, the system prioritizes the value of the phase-based TOA estimate, which is more robust to modeling errors inherent in calibrating hardware imperfections (e.g., non-reciprocity and non-linearity).

Alternatively, the system can calculate the overall measurement uncertainty for the hybrid TOA estimate based on the value of the Rician K-factor. For example, a low value of the Rician K-factor may indicate a strong multipath environment, which may also reduce the accuracy of the sample-based and phase-based TOA estimates. Thus, the system can increase the uncertainty of the hybrid TOA estimate based on the multipath environment characterized by the Rician K-factor.

In one implementation, the system can execute a binary decision tree based on a threshold value of the multipath metric (e.g., 10 dB for the Rician K-factor) to determine the weights for the phase-based TOA estimate and the phase-amplitude-based TOA estimate. In one example, in response to detecting that the multipath metric exceeds the threshold value, the system can set the weight for the phase-based TOA estimate to one and the phase-amplitude-based TOA estimate to zero, thereby setting the hybrid TOA estimate to equal the phase-based TOA estimate. In this example, in response to detecting that the Rician K-factor multipath metric does not exceed the threshold value, the system can set the weight for the phase-based TOA estimate to zero and the phase-amplitude-based TOA estimate to one.

In another implementation, the system: calculates weights for the phase-based TOA estimate and the phase-amplitude-based TOA estimate such that the weights are proportional or inversely proportional to the multipath metric respectively; and calculates a weighted average of the phase-based TOA estimate and the phase-amplitude-based TOA estimate based on the previously calculated weights. Thus, the system can include information from both the phase-based TOA estimate and the phase-amplitude-based TOA estimate in calculating the hybrid TOA estimate.

However, in applications in which both the phase-based TOA estimate and the phase-amplitude-based TOA estimate are inaccurate, the system can detect these inaccuracies based on a comparison with the sample-based TOA estimate. In one implementation, the system can calculate an upper bound of a sample-based uncertainty interval and a lower bound of a sample-based uncertainty interval by adding and subtracting the sample-based uncertainty from the sample-based TOA estimate respectively. The system can then detect that the above-described weighted combination of the phase-based TOA estimate and the phase-amplitude-based TOA estimate falls within the calculated sample-based uncertainty interval. If so, the system can select the weighted combination as the hybrid TOA estimate.

In yet another implementation, the system can calculate a weighted average of the sample-based TOA estimate, the phase-based TOA estimate, and the phase-amplitude-based TOA estimate. In this implementation, the system calculates the weights for each TOA estimate based on the sample-based uncertainty, the phase-based uncertainty, and the multipath metric respectively. Thus, the system can utilize three different TOA estimates in order to further improve the accuracy of the hybrid TOA estimate.

In yet another implementation, the system can: calculate a threshold interval based on the phase-based uncertainty; detect that the phase-amplitude-based TOA estimate falls within the threshold interval of the phase-based TOA estimate; and, in response to detecting that the phase-amplitude-based TOA estimate falls within the threshold interval of the phase-based TOA estimate (i.e., agreement between the phase-amplitude-based TOA estimate and the phase-based TOA estimate), calculate a hybrid TOA estimate equal to the phase-amplitude-based TOA estimate. If the system detects that the phase-amplitude-based TOA estimate falls outside of the threshold interval of the phase-based TOA estimate, the system can instead calculate a weighted average of the sample-based TOA estimate, the phase-based TOA estimate, and/or the phase-amplitude based TOA estimate.

In yet another implementation, the system can calculate a hybrid TOA estimate as a weighted combination of the sample-based TOA estimate, the phase-based TOA estimate, the phase-amplitude-based TOA estimate, a sub-sample-based TOA estimate, a sparse multipath-based TOA estimate, and/or a signal strength-based TOA estimate. In this implementation, the system can assign a weight to each TOA estimate, the representing multipath resilience associated with the corresponding TOA estimation process, relative precision associated with the corresponding TOA estimation process, uncertainty associated with the corresponding TOA estimation process, and/or computational complexity associated with the corresponding TOA estimation process. For example, the system can assign a weight to the sub-sample-based time-of-arrival estimate, the weight representing multipath resilience associated with the sub-sample-based TOA estimation process, relative precision associated with the sub-sample-based TOA estimation process, uncertainty associated with the sub-sample-based TOA estimation process, and/or computational complexity associated with the sub-sample-based TOA estimation process.

16. Ranging and Multilateration

In one implementation, upon calculating the hybrid TOA estimate, the system can calculate the range at which the transmitter transmitted the ranging signal (e.g., the distance between the transmitter and the receiver). More specifically, the system can access a time-of-departure of the ranging signal from the transmitter; access a relative time bias between the transmitter and the receiver; and calculate a hybrid range estimate for a distance between the transmitter and the receiver based on the hybrid time-of-arrival estimate, the time-of-departure of the ranging signal, and the relative time bias between the transmitter and the receiver.

In one implementation, the system can: calculate a TOF of the ranging signal and, therefore, a distance between the transmitter and the receiver by achieving precise clock synchronization between the receiver and the transmitter, compensating for latency introduced by the application specific signal processing circuit, and comparing the hybrid TOA estimate to a known transmission time at the transmitter. The system can then multiply the TOF of the ranging signal by the speed of the ranging signal (e.g., the speed of light, sound, or electrical propagation corresponding to the relevant medium). Thus, multiple receiver nodes in the network of nodes executing the method S100 based on the same ranging signal can each calculate a range between the receiver and the transmitter. The system can then input these distances and known locations of each receiver into a multilateration algorithm in order to localize the transmitter with a high degree of accuracy (e.g., within ten meters, within ten centimeters).

In one implementation, the system can instead include a single receiver receiving multiple ranging signals from multiple transmitters with known locations. In this implementation, the receiver can execute the method S100 described above in order to: calculate a hybrid TOA estimate for each ranging signal; calculate a distance between each transmitter and the receiver; and input these distances into a multilateration algorithm in order to localize the receiver relative to the transmitters with known locations.

17. TDOA and PDOA Ranging Variations

Alternatively, in applications in which the system cannot achieve precise clock synchronization between the transmitter and the receiver, or in applications in which uncalibrated frequency dependent delays are present in the ranging signal, the system can execute time-difference-of-arrival (hereinafter "TDOA") localization and/or phase-difference-of-arrival (hereinafter "PDOA") to localize the transmitter more accurately.

Figure 4:
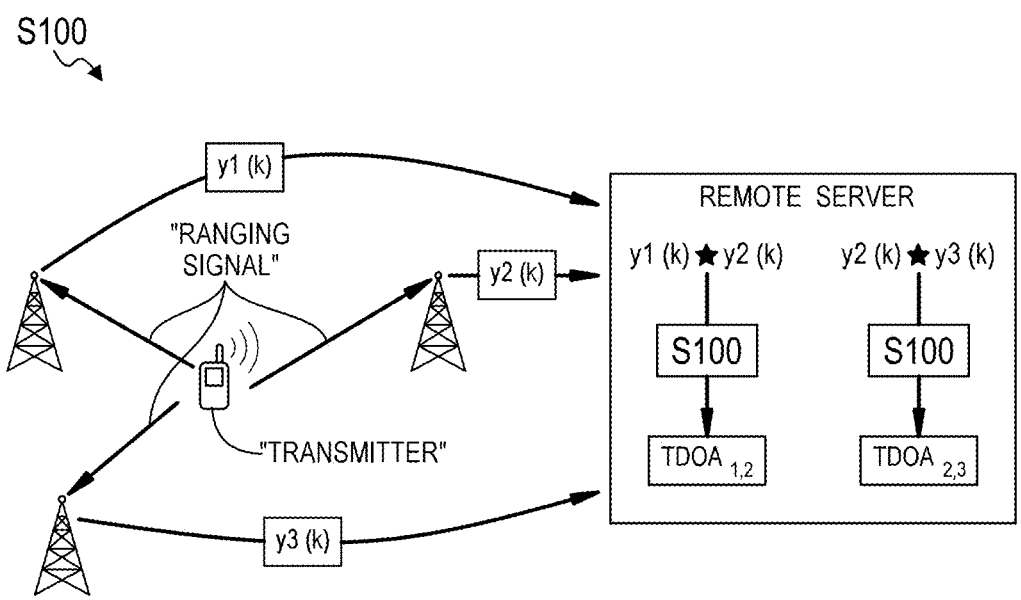
FIG. 4 is a schematic representation of one variation of the method.
Figure 5:
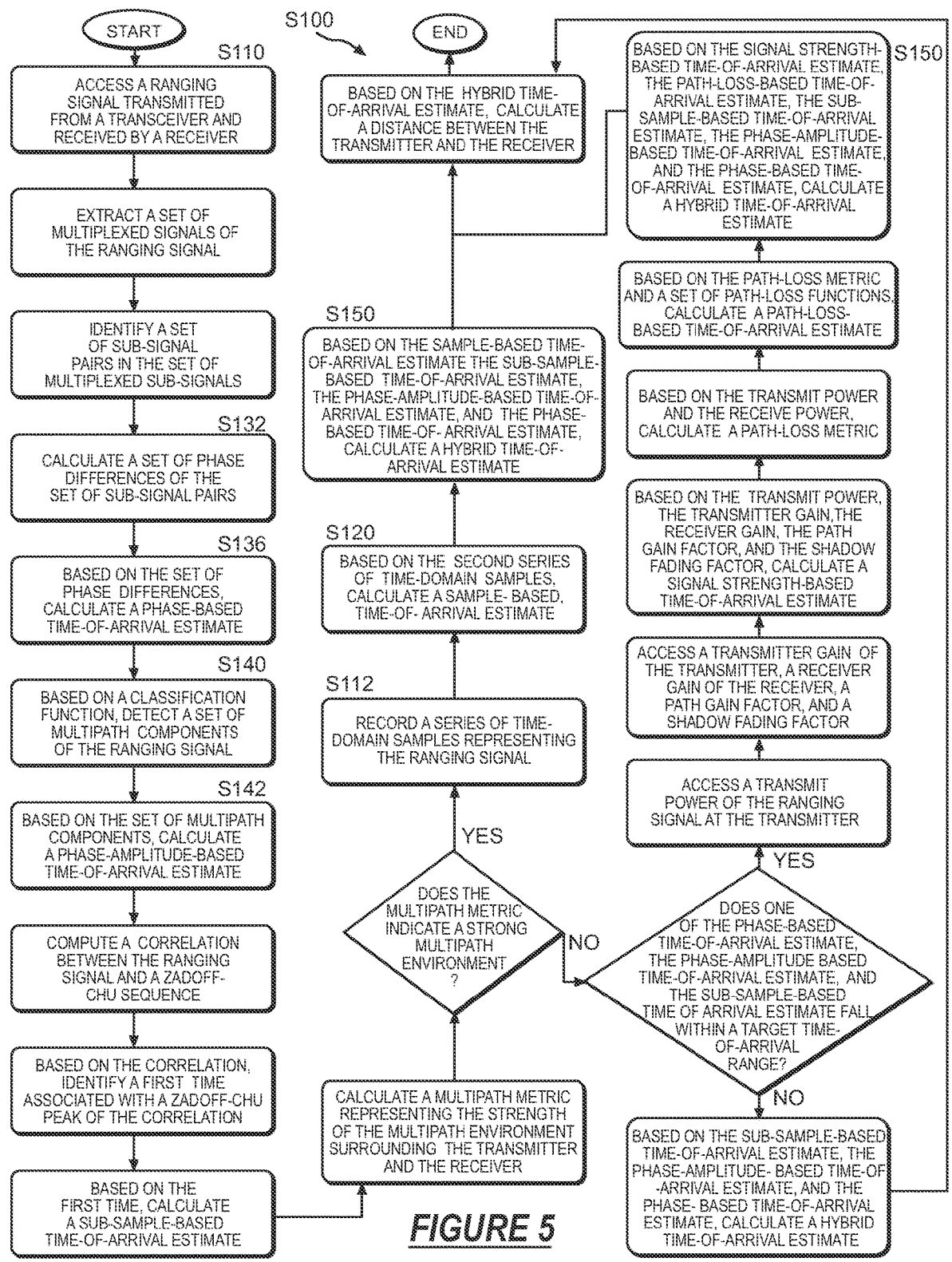
FIG. 5 is a flowchart representation of one variation of the method.
Figure 6:
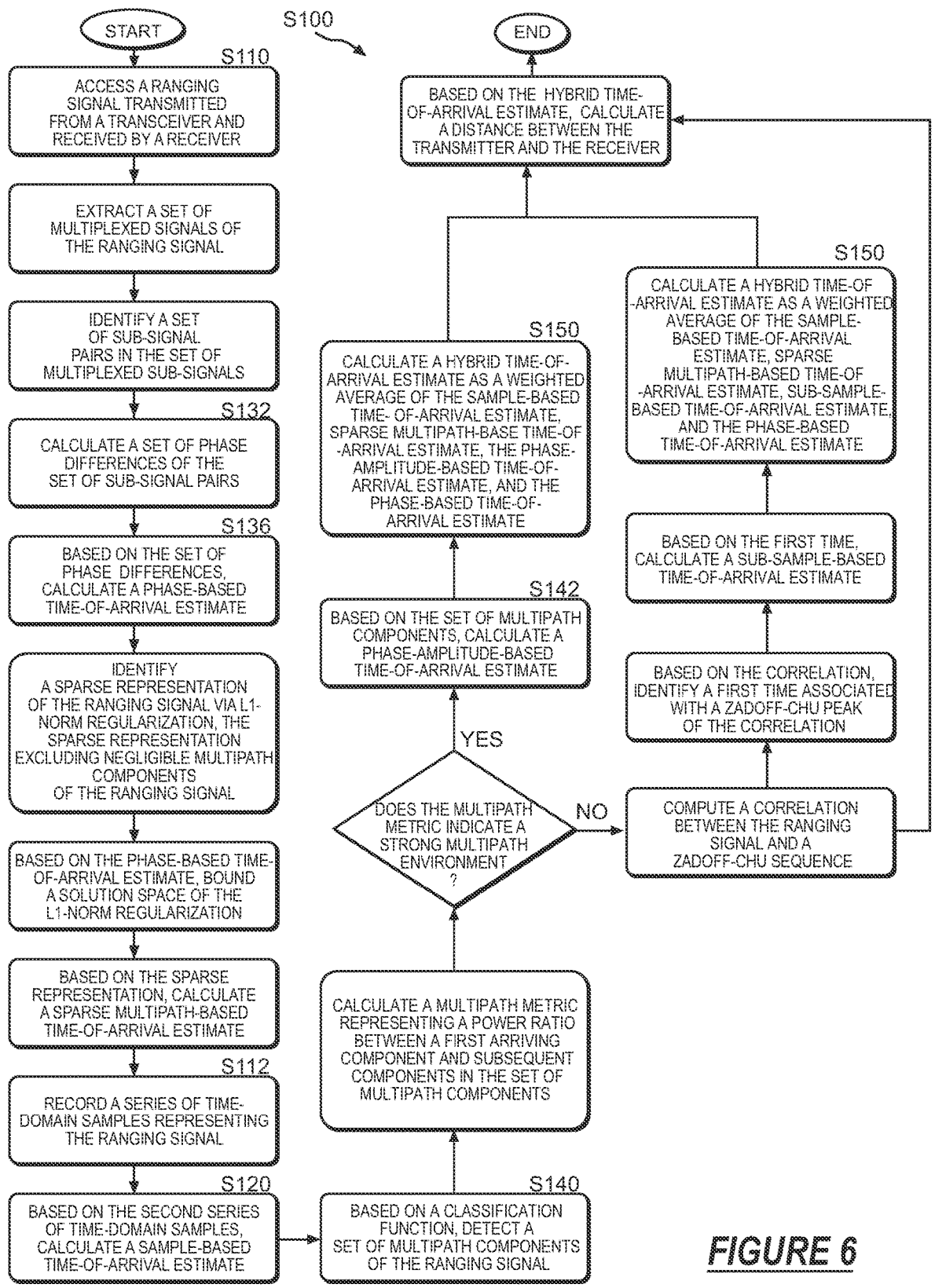
FIG. 6 is a flowchart representation of one variation of the method.

In one variation, shown in FIG. 4, the system generates a sample-based TDOA estimate based on cross-correlated ranging signal and/or a phase-amplitude-based TDOA estimate based on complex conjugate multiplication of the received complex signals at the correlation peaks of the two receivers and selects the compound multipath component closest to the phase-based TDOA estimate as a phase-amplitude-based TDOA estimate.

In another variation, upon executing the MUSIC algorithm on a ranging signal as described above, the system generates a MUSIC pseudospectrum for each receiver in a mesh network of receivers. The system can then calculate a hybrid TOA estimate by executing Blocks of the method S100 for each receiver in the mesh network. Subsequently, the system can access these hybrid TOA estimates from multiple receivers and calculate hybrid TDOAs for each pair of receivers by subtracting the hybrid TOA estimates of each pair of receivers. Upon generating a set of TDOAs for each pair of transceivers and given locations of each receiver in the mesh network, the system can execute a TDOA multilateration algorithm to calculate a location of the transmitter.

In a PDOA variation instead of calculating a TOA estimate at each receiver, the system can: access a POA of the ranging signal at each receiver in a pair of receivers in the mesh network of receivers (which may include a relative phase offset of the pair of receivers); calculate a PDOA based on the POA from the pair of receivers by subtracting the relative phase offset of the pair of receivers; and estimate a TDOA via the MUSIC algorithm described above based on the calculated PDOA. However, in this variation, the earliest peak of the MUSIC pseudospectrum may not correspond to the LOS component of the ranging signal for either or both receivers in the pair of receivers, therefore, the system identifies the LOS TDOA from the MUSIC pseudo spectrum via other means described in further detail below.

In one example of the PDOA variation, the system can select a peak of the MUSIC pseudospectrum with the greatest amplitude as the LOS TDOA. In another example, using the complex phase and amplitudes of the ranging signal at a pair of receivers, the system can generate a MUSIC pseudospectrum including multiple peaks for each pair of receivers in the mesh network such that each peak corresponds to a TDOA estimate. Subsequently, the system can access a set of TDOAs (i.e., a set of three TDOAs) of the ranging signal at a set of three receivers based on combinations of peaks of the MUSIC pseudospectra (e.g., by selecting a combination of peaks from the MUSIC pseudospectrum of a first receiver and the peaks from the MUSIC pseudospectrum of a second receiver). For any set of three receivers, the sum of the TDOAs of a closed graph of receivers may be equal to zero, assuming an ideal channel environment between the transmitter and the receivers (e.g., accurate TDOAs in the absence of noise). Thus, the system can calculate a sum of TDOAs and select the combination of multipath components of TDOAs with a sum closest to zero as the LOS TDOA estimates. Thus, in this variation, the system can utilize information from multiple receivers to identify LOS TDOAs for each pair of receivers in the mesh network. The system can repeat this process for each graph of three receivers receiving the ranging signal. Upon calculating LOS TDOAs for each pair of receivers in the mesh network by iterating through graphs of three receivers, the system can execute a TDOA multilateration algorithm to estimate the location of the transmitter relative to the mesh network of receivers.

In another implementation, the system can execute a geometric analysis of the location of the transmitter relative to the locations of the receivers for each combination of multipath components identified by the MUSIC algorithm. For example, the system can calculate a TDOA MUSIC pseudospectrum for a pair of receivers of the ranging signal based on a cross-correlation of the ranging signal received at each receiver in the pair of receivers; access known locations of the receivers in the pair of receivers or a distance between the receivers in the pair of receivers; select a TDOA candidate from the peaks of the TDOA MUSIC pseudospectrum; and calculate a 2D location estimate for the transmitter of the ranging signal based on the TDOA candidate. Upon calculating the 2D location estimate of the transmitter, the system can execute a geometric analysis to identify whether the location of the transmitter is consistent with previous known locations of the transmitter and/or known geometry or characteristics of the area encompassing the transmitter and receivers. In instances in which the system cannot resolve a 2D location estimate based on a TDOA candidate (e.g., instances in which the TDOA candidate implies a distance between receivers greater than the known distance between receivers) or instances in which the 2D location estimate is not consistent with known geometry of the area and/or prior known locations of the transmitter or receivers, the system can eliminate the TDOA candidate from a set of plausible TDOAs for the ranging signal. By repeating the steps above for each peak of the TDOA MUSIC pseudospectrum representing a TDOA candidate, the system can reduce the number of TDOA candidates and/or narrow the range of possible TDOA values.

In instances in which multipath components are present in the ranging signal transmitted between receivers (e.g., in a mesh network deployment), the system can also iterate through candidate ranges between receivers as well as iterating through TDOA candidates of the ranging signal received at each receiver in a pair of receivers. By evaluating each possible combination of TDOA candidate and range candidate for a pair of receivers, the system can eliminate combinations not consistent with known geometric relationships between the transmitter and the pair of receivers.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media, such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a first time period:
accessing a first ranging signal transmitted from a transmitter and received by a receiver, the first ranging signal comprising:
a first set of multiplexed sub-signals, each multiplexed sub-signal in the first set of multiplexed sub-signals characterized by a frequency in a set of frequencies;
identifying a first set of sub-signal pairs in the first set of multiplexed sub-signals;
calculating a first set of phase differences of the first set of sub-signal pairs;
based on the first set of phase differences of the first set of sub-signal pairs, calculating a first phase-based time-of-arrival estimate;
recording a first series of time-domain samples representing the first ranging signal;

based on the first series of time-domain samples, calculating a first sample-based time-of-arrival estimate;

based on the first sample-based time-of-arrival estimate and the first phase-based time-of-arrival estimate, calculating a first hybrid time-of-arrival estimate; and based on the first hybrid time-of-arrival estimate, calculating a first distance between the transmitter and the receiver.

2. The method of claim 1:

wherein calculating the first phase-based time-of-arrival estimate comprises:

prior to calculating the first sample-based time-of-arrival estimate, calculating the first phase-based time-of-arrival estimate; and wherein calculating the first sample-based time-of-arrival estimate comprises:

detecting a set of multipath components characterizing the first ranging signal;

based on the set of multipath components, calculating a multipath metric characteristic of a power ratio between a line-of-sight component and non-line-of-sight components in the set of multipath components characteristic of the first ranging signal; and in response to the multipath metric falling below a multipath threshold:

detecting strong multipath environment between/surrounding the transmitter and the receiver; and calculating the first sample-based time-of-arrival estimate.

3. The method of claim 2:

further comprising:

during the first time period:

based on a sampling frequency associated with the receiver, calculating a first uncertainty of the first sample-based time-of-arrival estimate;

calculating an upper bound of a sample-based uncertainty interval by adding the first uncertainty to the first sample-based time-of-arrival estimate; and calculating a lower bound of the sample-based uncertainty interval by subtracting the first uncertainty from the first sample-based time-of-arrival estimate; and wherein calculating the first hybrid time-of-arrival estimate comprises:

in response to the first phase-based time-of-arrival estimate exceeding the lower bound and falling below the upper bound, setting the first phase-based time-of-arrival estimate as the first hybrid time-of-arrival estimate.

4. The method of claim 3, wherein calculating the first hybrid time-of-arrival estimate comprises:

in response to one of the first phase-based time-of-arrival estimates falling below the lower bound and the first phase-based time-of-arrival estimate exceeding the upper bound, setting the first sample-based time-of-arrival estimate as the first hybrid time-of-arrival estimate.

5. The method of claim 1:

further comprising:

during the first time period:

computing a correlation between the first ranging signal and a target ranging signal;

identifying a first time associated with a highest correlation peak of the correlation; and based on the first time, deriving a sub-sample-based time-of-arrival estimate; and wherein calculating the first hybrid time-of-arrival estimate comprises:

based on the sub-sample-based time-of-arrival estimate, the first sample-based time-of-arrival estimate, and the first phase-based time-of-arrival estimate, calculating the first hybrid time-of-arrival estimate.

6. The method of claim 5:

wherein computing the correlation between the first ranging signal and the target ranging signal comprises:

computing the correlation between the first ranging signal and a Zadoff-Chu sequence; and wherein identifying the first time associated with the highest correlation peak of the correlation comprises:

identifying the first time associated with a Zadoff-Chu peak of the correlation.

7. The method of claim 1:

further comprising:

during the first time period:

concurrently:

executing L1-norm regularization to identify a sparse representation of the channel, the sparse representation excluding insignificant multipath components of the first ranging signal; and based on the first phase-based time-of-arrival estimate, bounding a solution space of the L1-norm regularization; and based on the sparse representation of the channel, calculating a time-of-arrival estimate for the line-of-sight component of the ranging signal; and wherein calculating the first hybrid time-of-arrival estimate comprises:

based on the sparse multipath time-of-arrival estimate, the first sample-based time-of-arrival estimate, and the first phase-based time-of-arrival estimate, calculating the first hybrid time-of-arrival estimate.

8. The method of claim 1:

further comprising:

during the first time period:

based on a signal classification function, detecting a set of multipath components characteristic of the first ranging signal;

based on the set of multipath components characteristic of the first ranging signal, calculating a phase-amplitude-based time-of-arrival estimate; and based on the set of multipath components, calculating a multipath metric representing a Rician K-factor of a power ratio between a first arriving component and subsequent components in the set of multipath components characteristic of the first ranging signal; and wherein calculating the first hybrid time-of-arrival estimate comprises:

based on the multipath metric, the first sample-based time-of-arrival estimate, the first phase-based time-of-arrival estimate, and the phase-amplitude-based time-of-arrival estimate, calculating the first hybrid time-of-arrival estimate.

9. The method of claim 1:

further comprising:

during the first time period:

accessing a transmit power of the first ranging signal at the transmitter;

accessing a transmit antenna gain of the transmitter;

accessing a receive antenna gain of the receiver;

based on the transmit power, the transmit antenna gain, and the receive antenna gain, calculating a receive power of the first ranging signal at the receiver; and based on the receive power, calculating a signal strength-based distance estimate between the transmitter and the receiver; and wherein calculating the first distance comprises:
based on the first hybrid time-of-arrival estimate and the signal strength-based distance estimate, calculating the first distance.

10. The method of claim 9:
further comprising:
during the first time period:
based on the transmit power and the receive power of the first ranging signal, calculating a path loss metric;

accessing a set of path loss functions relating the path loss metric to a distance between the transmitter and the receiver; and based on the set of path loss functions and the path loss metric, calculating a set of probabilities, each probability in the set of probabilities:
corresponding to a path loss function in the set of path loss functions; and
characterizing a fit of the path loss metric to each path loss function in the set of path loss functions;

based on the set of path loss functions and the path loss metric, calculating a set of range estimates; and calculating a path-loss-based distance estimate as a weighted average of the set of range estimates weighted by the set of probabilities; and wherein calculating the first distance comprises:
based on the first hybrid time-of-arrival estimate, the signal strength-based distance estimate, and the path-loss-based distance estimate, calculating the first distance.

11. The method of claim 1, further comprising:
at a first time during a second time period:
accessing a second ranging signal transmitted from the transmitter and received by the receiver, the second ranging signal comprising:
a second set of multiplexed sub-signals, each multiplexed sub-signal in the second set of multiplexed sub-signals characterized by a frequency in the set of frequencies;

identifying a second set of sub-signal pairs in the second set of multiplexed sub-signals;

calculating a second set of phase differences of the second set of sub-signal pairs;

based on the second set of phase differences of the second set of sub-signal pairs, calculating a second phase-based time-of-arrival estimate;

detecting a set of multipath components characteristic of the second ranging signal based on a signal classification function;

calculating a phase-amplitude-based time-of-arrival estimate based on the set of multipath components characteristic of the second ranging signal;

computing a correlation between the second ranging signal and a target ranging signal;

identifying a first time associated with a highest correlation peak of the correlation; and based on the first time, calculating a sub-sample-based time-of-arrival estimate;

based on the second phase-based time-of-arrival estimate, the phase-amplitude-based time-of-arrival estimate, and the sub-sample-based time-of-arrival estimate, calculating a second hybrid time-of-arrival estimate; and based on the second hybrid time-of-arrival estimate, calculating a second distance between the transmitter and the receiver.

12. The method of claim 11, further comprising, at a second time during the second time period:
based on the set of multipath components, calculating a multipath metric characterizing a power ratio between a line-of-sight component and non-line-of-sight components in the set of multipath components of the second ranging signal; and in response to the multipath metric indicating a strong multipath environment between the transmitter and the receiver:
recording a second series of time-domain samples representing the second ranging signal; and
calculating a second sample-based time-of-arrival estimate based on the second series of time-domain samples.

13. The method of claim 12:
further comprising:
at the second time during the second time period:
calculating a first difference between the second sample-based time-of-arrival estimate and the second phase-based time-of-arrival estimate;
calculating a second difference between the second sample-based time-of-arrival estimate and the phase-amplitude-based time-of-arrival estimate; and
calculating a third difference between the second sample-based time-of-arrival estimate and the sub-sample-based time-of-arrival estimate;

wherein calculating the second hybrid time-of-arrival estimate comprises:
in response to the first difference and the third difference exceeding a threshold difference and the second difference falling below the threshold difference:
based on the second sample-based time-of-arrival estimate and the phase-amplitude-based time-of-arrival estimate, calculating the second hybrid time-of-arrival estimate.

14. The method of claim 12:
further comprising:
assigning a first score to the second phase-based time-of-arrival estimate, the first score representing multipath resilience associated with a phase-based time-of-arrival estimation process;

assigning a second score to the phase-amplitude-based time-of-arrival estimate, the second score representing multipath resilience associated with a phase-amplitude time-of-arrival estimation process;

assigning a third score to the sub-sample-based time-of-arrival estimate, the third score representing multipath resilience associated with a sub-sample-base time-of-arrival estimation process; and assigning a fourth score to the second sample-based time-of-arrival estimate, the fourth score representing multipath resilience associated with a sample-based time-of-arrival estimation process; and wherein calculating the second hybrid time-of-arrival estimate comprises:
calculating the second hybrid time-of-arrival estimate as a weighted average of the second phase-based time-of-arrival estimate weighted by the first score, the phase-amplitude-based time-of-arrival estimate weighted by the second score, the sub-sample-based time-of-arrival estimate weighted by the third score, and the second sample-based time-of-arrival estimate weighted by the fourth score.

15. The method of claim 11, further comprising:
in response to the second distance falling within a target range representing a range of distances associated with precise signal-strength-based range estimation:
  accessing a transmit power of the second ranging signal at the transmitter;
  based on the transmit power, calculating a receive power of the first ranging signal at the receiver; and
  based on the receive power, calculating a signal strength-based distance between the transmitter and the receiver.

16. The method of claim 15:
further comprising:
  assigning a first score to the second phase-based time-of-arrival estimate, the first score representing ranging precision associated with a phase-based time-of-arrival estimation process;
  assigning a second score to the phase-amplitude-based time-of-arrival estimate, the second score representing ranging precision associated with a phase-amplitude-based time-of-arrival estimation process;
  assigning a third score to the sub-sample-based time-of-arrival estimate, the third score representing ranging precision associated with a sub-sample-based time-of-arrival estimation process;
  based on the signal strength-based distance, calculating a signal strength-based time-of-arrival estimate; and
  assigning a fourth score to the signal strength-based time-of-arrival estimate, the fourth score representing ranging precision associated with a signal strength-based time-of-arrival estimation process; and
wherein calculating the second hybrid time-of-arrival estimate comprises:
  calculating the second distance as a weighted average of the second phase-based time-of-arrival estimate weighted by the first score, the phase-amplitude-based time-of-arrival estimate weighted by the second score, the sub-sample-based time-of-arrival estimate weighted by the third score, and the signal strength-based time-of-arrival estimate weighted by the fourth score.

17. The method of claim 1:
further comprising:
  calculating a first uncertainty of the first sample-based time-of-arrival estimate based a sampling frequency associated with the receiver; and
  calculating a second uncertainty of the first phase-based time-of-arrival estimate based on a variability measure characteristic of a phase difference of each sub-signal pair in the first set of sub-signal pairs; and
wherein calculating the first hybrid time-of-arrival estimate comprises:
  calculating the first hybrid time-of-arrival estimate as a weighted combination of the first sample-based time-of-arrival estimate weighted by the first uncertainty and the first phase-based time-of-arrival estimate weighted by the second uncertainty.

18. A method comprising:
accessing a ranging signal transmitted from a transmitter and received by a receiver, the ranging signal comprising:
  a set of multiplexed sub-signals, each multiplexed sub-signal characterized by a frequency in a set of frequencies;
recording a first series of time-domain samples representing the ranging signal;
calculating a set of phase differences for a set of sub-signal pairs in the set of multiplexed sub-signals;
calculating a first time-of-arrival estimate based on the set of phase differences of the set of sub-signal pairs;
detecting a set of multipath components characteristic of the ranging signal based on a multiple signal classification function;
calculating a second time-of-arrival estimate based on the set of multipath components characteristic of the ranging signal;
characterizing a hybrid time-of-arrival estimate based on a combination of the first time-of-arrival estimate and the second time-of-arrival estimate; and
calculating a distance between the transmitter and the receiver based on the hybrid time-of-arrival estimate.

19. The method of claim 18, wherein calculating the first time-of-arrival estimate comprises:
identifying a subset of multiplexed sub-signals, in the set of multiplexed sub-signals, based on a threshold frequency difference, the threshold frequency difference based on a threshold propagation time of the ranging signal from the transmitter to the receiver;
for each sub-signal pair in the subset of multiplexed sub-signals:
  calculating a sub-signal pair time-of-arrival estimate based on a phase difference of the sub-signal pair;
calculating a central tendency metric descriptive of the sub-signal pair time-of-arrival estimates for the sub-signal pairs in the set of sub-signal pairs; and
calculating the first time-of-arrival estimate based on the central tendency metric.

20. A method comprising:
accessing a ranging signal transmitted from a transmitter and received by a receiver, the ranging signal comprising:
  a set of multiplexed sub-signals, each multiplexed sub-signal in the set of multiplexed sub-signals characterized by a frequency in a set of frequencies;
recording a first series of time-domain samples representing the ranging signal;
calculating a first time-of-arrival estimate based on the series of time-domain samples;
detecting a set of multipath components characteristic of the ranging signal;
calculating a second time-of-arrival estimate based on the set of multipath components characteristic of the ranging signal;
characterizing a hybrid time-of-arrival estimate based on a combination of the first time-of-arrival estimate and the second time-of-arrival estimate; and
calculating a distance between the transmitter and the receiver based on the hybrid time-of-arrival estimate.

* * * * *